US007434161B2

(12) United States Patent
Todaka et al.

(10) Patent No.: US 7,434,161 B2
(45) Date of Patent: Oct. 7, 2008

(54) DOCUMENT REGISTRATION SYSTEM, METHOD THEREOF, PROGRAM THEREOF AND STORAGE MEDIUM THEREOF

(75) Inventors: Shinji Todaka, Kanagawa (JP); Naoyuki Matsumoto, Kanagawa (JP); Masashi Yahara, Kanagawa (JP); Tomofumi Yoshida, Tokyo (JP); Yasunori Satake, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 10/235,755

(22) Filed: Sep. 6, 2002

(65) Prior Publication Data

US 2003/0051208 A1 Mar. 13, 2003

(30) Foreign Application Priority Data

Sep. 11, 2001 (JP) ............................ 2001-275064

(51) Int. Cl.
*G06F 17/00* (2006.01)

(52) U.S. Cl. ...................................... 715/255; 358/403

(58) Field of Classification Search ................. 715/530, 715/255; 358/403
See application file for complete search history.

(56) References Cited

U.S. PATENT DOCUMENTS 4,878,110 A * 10/1989 Maruyama et al. .......... 358/530
5,058,185 A * 10/1991 Morris et al. ............... 382/305
5,129,016 A * 7/1992 Murakami et al. .......... 382/306

(Continued)

FOREIGN PATENT DOCUMENTS

JP 08-153144 6/1996
JP 11-272707 10/1999

(Continued)

OTHER PUBLICATIONS

Cetintemel, U., et al, "Self-Adaptive User Profiles for Large-Scale Data Delivery", Proceedings of the 16th International Conference on Data Engineering, Mar. 2000, pp. 622-633.*

(Continued)

*Primary Examiner*—Laurie Ries
(74) *Attorney, Agent, or Firm*—Fitzpatrick, Cella, Harper & Scinto

(57) ABSTRACT

A document registration system, for registering a document image transmitted from an external device by a push technique in a document management system without any labor, acquires document image data transmitted from the external device by the push technique, automatically executes recognition processing of the acquired document image data; and automatically registers the document image data in the document management system together with a result of the recognition as an index.

14 Claims, 19 Drawing Sheets

U.S. PATENT DOCUMENTS

| | | | | |
|---|---|---|---|---|
| 5,761,655 | A * | 6/1998 | Hoffman | 707/4 |
| 5,822,454 | A * | 10/1998 | Rangarajan | 382/180 |
| 5,832,470 | A * | 11/1998 | Morita et al. | 707/1 |
| 5,983,246 | A * | 11/1999 | Takano | 715/514 |
| 6,119,132 | A * | 9/2000 | Kuwano | 707/205 |
| 6,185,321 | B1 * | 2/2001 | Fukushima et al. | 382/135 |
| 6,199,082 | B1 * | 3/2001 | Ferrel et al. | 715/522 |
| 6,466,694 | B2 * | 10/2002 | Kamada et al. | 382/181 |
| 6,647,383 | B1 * | 11/2003 | August et al. | 707/3 |
| 6,812,961 | B1 * | 11/2004 | Parulski et al. | 348/231.2 |
| 6,876,759 | B2 * | 4/2005 | Keller et al. | 382/128 |
| 2002/0024685 | A1 * | 2/2002 | Sasaki et al. | 358/402 |

FOREIGN PATENT DOCUMENTS

| | | |
|---|---|---|
| JP | 2002-261490 | 9/2000 |
| JP | 2001-061035 | 3/2001 |
| JP | 2001-084254 | 3/2001 |

OTHER PUBLICATIONS

Tsuda, I., et al, "WorkWare: WWW-Based Chronological Document Organizer", Proceedings of the 3rd Asia Pacific Conference on Computer Human Interaction, Jul. 1998, pp. 380-385.*

Carlborn, Ingrid, et al, "SIGGRAPH '91 Workshop Report Integrating Computer Graphics, Computer Vision, and Image Processing in Scientific Applications", ACM SIGGRAPH Computer Graphics, vol. 26, Issue 1, Jan. 1992, pp. 8-17.*

Japanese Office Action dated Jun. 24, 2008 in corresponding Japanese Application No. 2001-275064, and partial English language translation thereof.

* cited by examiner

DOCUMENT REGISTRATION SYSTEM, METHOD THEREOF, PROGRAM THEREOF AND STORAGE MEDIUM THEREOF

BACKGROUND OF THE INVENTION

1. Field of the Invention

The present invention relates to a document registration system, a method, a program and a storage medium for registering, in a document management system, image data transmitted from an external device such as a network digital multifunction machine (such as a multifunction printer and so on) in a way that automatically attaches an index thereto.

2. Related Background Art

A conventional system is that an input image read by a scanner is temporarily displayed on the screen, and a user manually attaches an index thereto while seeing the screen and registers the input image attached with the index in a document management part.

SUMMARY OF THE INVENTION

In a mode where the user manually creates and attaches the index as by the prior art, a tremendous load is applied onto the user, and besides this is greatly time-consuming. Further, this manual operation leads to an increase in working time of the user, resulting in a rise in costs.

Moreover, the manual input by the user might bring about an increase in mistake of input as a quantity of the documents rises. If registered as they are in the document management system, it follows that precise search processing using the index is hindered.

Furthermore, even when the document is transmitted from the device by the push technique, the processing is not executed unless the user operates, and it follows that the document transmitted to the document registration system stays therein.

According to one aspect of the present invention, a document registration system comprises acquisition means for acquiring document image data transmitted from an external device by a push technique, recognition means for automatically executing recognition processing of the acquired document image data, and registration means for automatically registering the document image data in a document management system together with a result of the recognition made by the recognition means as an index.

According to another aspect of the present invention, a document registration method for controlling a document registration system for automatically registering, in a document management system, document image data transmitted from an external device by a push technique, comprises an acquiring step of acquiring document image data transmitted from an external device by a push technique, a recognizing step of automatically executing recognition processing of the acquired document image data, and a registering step of automatically registering the document image data in a document management system together with a result of the recognition made in the recognizing step as an index.

According to a further aspect of the present invention, a document registration program, executable by a computer, for controlling a document registration system for automatically registering, in a document management system, document image data transmitted from an external device by a push technique, comprises a program code for an acquiring step of acquiring document image data transmitted from an external device by a push technique, a program code for a recognizing step of automatically executing recognition processing of the acquired document image data, and a program code for a registering step of automatically registering the document image data in a document management system together with a result of the recognition made in the recognizing step as an index.

Other features and advantages of the patent invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The present embodiment provides a document registration system capable of executing both of automatic processing and manual processing.

Figure 1:
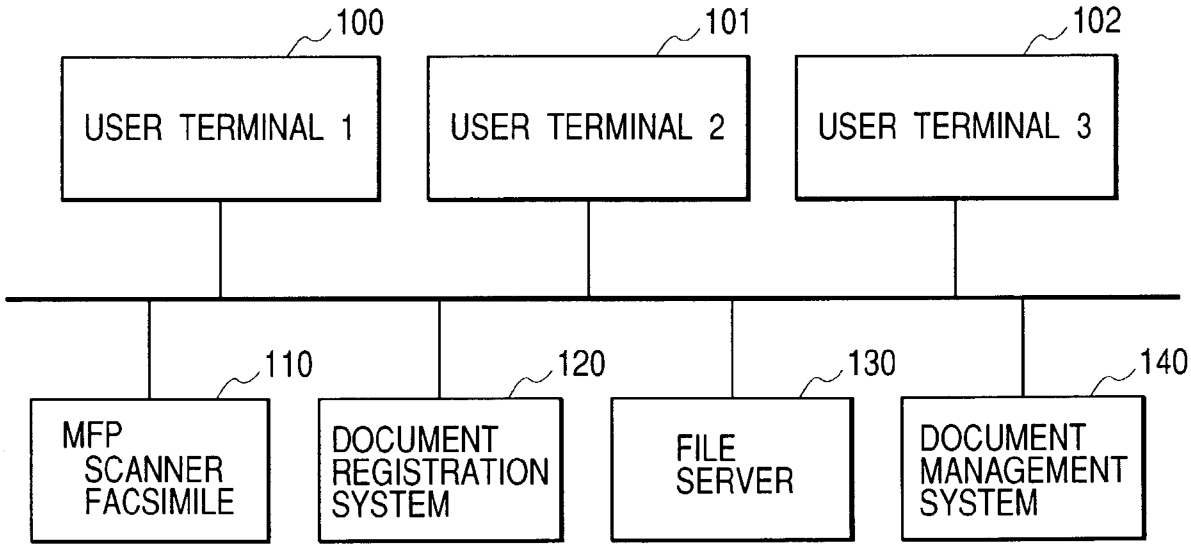
FIG. 1 is a diagram showing a system architecture in an embodiment of the present invention.

FIG. 1 shows a diagram of a system architecture in this embodiment.

Herein, user terminals (100, 101, 102), a Multifunction Peripheral (MFP) (110) having scanner/printer/copy functions, a document registration system (120), a file server (130) and a document management system (140), are connected to each other on a network.

The respective user terminal share various categories of documents by utilizing the file server 130 and the document management system 140. The categories of the documents include a document created by a general document creating application, a document read by a scanner, a document received by a facsimile and so on, which are intermingled.

Further, according to this embodiment, a document input device involves the use of the MFP 110 incorporating a plurality of functions, however, a single-function device such as a scanner device and a facsimile device may also be used as a substitute for the MFP.

The file server 130 manages concentratedly the documents that are cached therein. For example, the file server 130 caches document images read by a scanner part of the MFP 110, and the user terminals and the document registration system 120 can obtain the document images therefrom.

The document management system 140 manages concentratedly the documents that need saving over a long period of time. The document management system 140 stores, together with an index, the document transmitted from the document registration system, and is structured so that the system 140 can, when requested by the user terminal to transmit a desired document, search for this desired document with the index etc used as a key and transmit the same document. Further, the document management system may attach a plurality of indexes to one single document. Moreover, the plurality of indexes are managed in a way that categorizes these indexes according to every index item. Note that an assumption in this embodiment is that the document management system 140 is constructed of one document management device and may also be constructed of a combination of a plurality of devices. Further, there may also exist a plurality of document management systems 140.

The document registration system 120 has a function of automatically or manually specifying and acquiring a document (such as a received-by-facsimile document image, a read-by-scanner document image, etc) generated on the MFP 110 and the user terminal and a document cached in the file server, automatically creating indexes (attribute information/search information) for these documents on the basis of information when obtaining these documents and information obtained by analyzing these documents, and registering these documents attached with the indexes together in (a desired directory of) of the document management system 140. Further, the document registration system 120 has a function of registering the documents in the document management system in a way that attaches the documents with a variety of indexes manually inputted by the user, a function of re-editing the attribute information etc of the documents already registered in the document management system, and so forth. Note that the document registration system 120 is constructed of one document registration device in this embodiment and may also be constructed of a combination of a plurality of devices. Moreover, the document registration system may be configured by using a plurality of document registration devices each authorized to execute processing and executing cooperative processing so that a plurality of users can perform operations such as indexing and confirmation.

Note that the document registration device in this embodiment is a computer constructed of a CPU for executing actual processing operations, a Random Access Memory (RAM) used as a working area for a readout program, a storage medium (such as a hard disk, a Read Only Memory (ROM), a removable disk (a floppy disk, a CD-ROM etc) for storing a program for executing processes corresponding to flowcharts that will be explained later on and various items of data, a key board and a pointing device for performing various operations, a display for displaying the documents etc as processing targets, and a network interface for connecting to the network. The program executed by the CPU may be what is supplied from the storage medium and may also be what is read from an external device via the network. Note that actualization of the present embodiment involves executing the program by the computer, however, a part or the whole of the embodiment may be configured by hardware.

Figure 2:
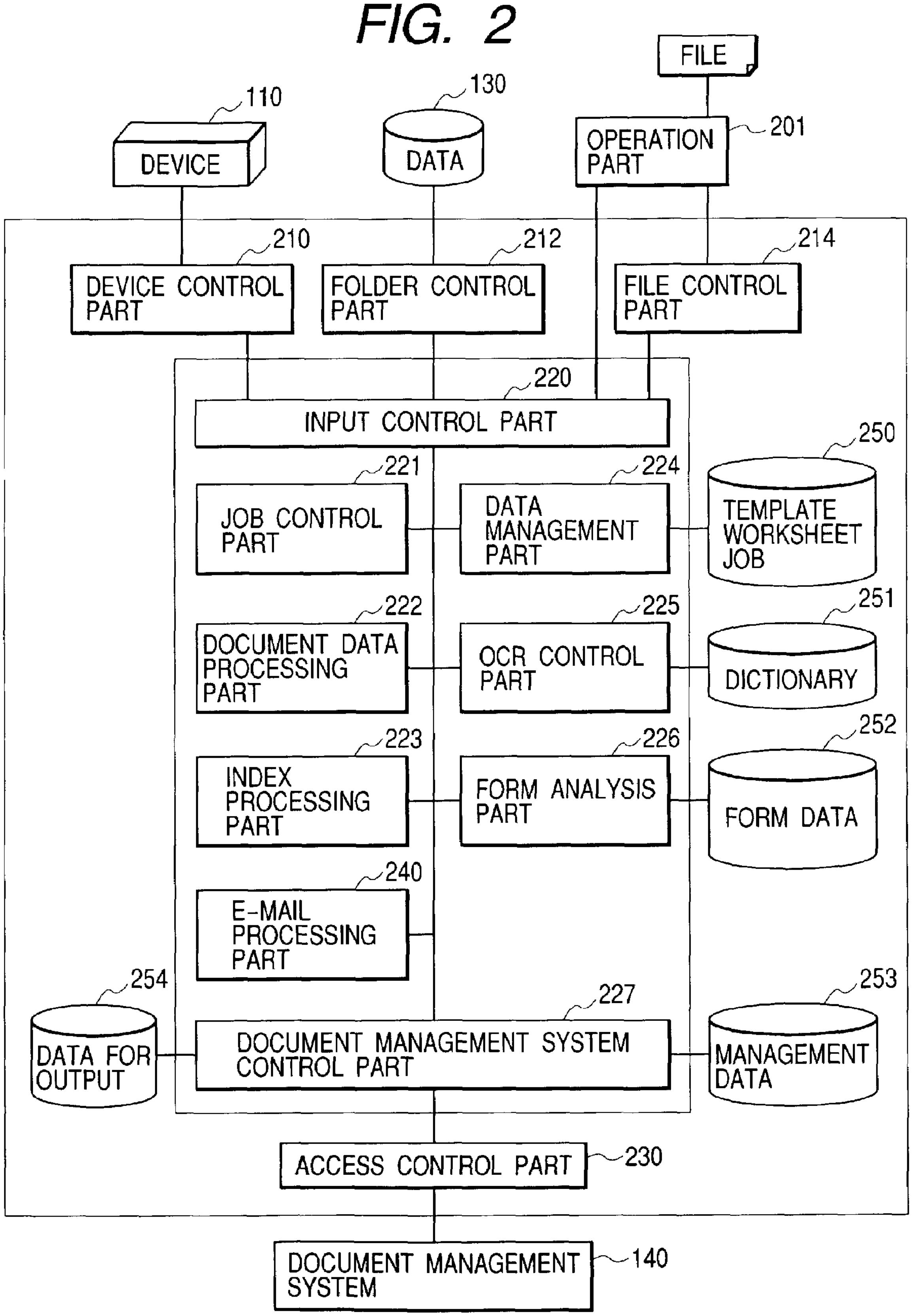
FIG. 2 is a block diagram showing an architecture of a document registration system.

FIG. 2 is a block diagram showing an architecture of the document registration system 120.

<Document Input Processing to Document Registration System>

To begin with, document input processing (document acquisition processing by the document registration system) to the document registration system 120 will be explained.

A device control part 210 obtains document data from the device (MFP) 110 incorporating the fax function and the scanner function, and inputs the same data to a posterior process. Note that the device control part 210 executes processing such as absorbing the document data by periodically monitoring the device, and receiving the document data transmitted by the push technique from the device.

A numeral 130 represents a folder (storage device) stored with the documents in the file server etc, and a folder control part 212 acquires the document data from within the folder of the file server. For instance, the folder control part 212 periodically monitors the predetermined folder of the file server and, if a new document exists, executes processing of acquiring this new document.

A numeral 201 designates an operation part in the this document registration system 120. The operation part 201 is capable of setting and operating the variety of systems, then importing (acquiring), when the user operating the document registration system specifies the document, the document data from the user terminal and the file server, and executing input processing of inputting the document acquired by the manual specification trough the file control part 214.

A numeral 220 denotes an input control part is structured to be capable of controlling in a unified manner the inputs from the device control part 210, the folder control part 212 and the file control part 214.

<Internal Processing of Document Registration System>

Next, processing within the document registration system will be described.

A numeral 221 stands for a job control part implementing control related to jobs which will be mentioned later on.

A numeral 222 represents a document data processing part that executes image format conversion processing etc.

A numeral 223 indicates an index processing part implementing control related to index processing that will be explained later on.

A numeral 224 designates a data managing part that saves pieces of data about a template, a worksheet, jobs etc which will be described later on in a data storage area 250, and thus manages the data.

A numeral 225 indicates an OCR control part which recognizes characters with the aid of dictionary data 251.

A numeral 226 represents a form (document) analysis part structured to be capable of automatically identifying a variety of forms, e.g., a document format with the aid of registration form data 252.

A numeral 240 indicates an E-mail processing part used for notifying, if set to execute processing of automatically obtaining and registering the document and if this automatic processing is implemented, a previously registered destination of a result of this processing.

<Access Processing to Document Management System in Document Registration System>

Subsequently, an interface with the document management system in the document registration system, will be explained.

A numeral 227 denotes a document management system control part that executes processing such as registering the documents and indexes and changing the indexes to the documents which have already been registered in the document management system through an access control part 230 provided corresponding to a type of the document management system 140.

A numeral 253 indicates a database for storing access data required for accessing the document management system. A numeral 254 represents a data area for caching the data to be registered in the document management system. This data area is used as a buffer if document data processing such as a predetermined image conversion etc is needed when registering the document.

<<Basic Flow (FIG. 3) of Document Registration System>>

Figure 3:
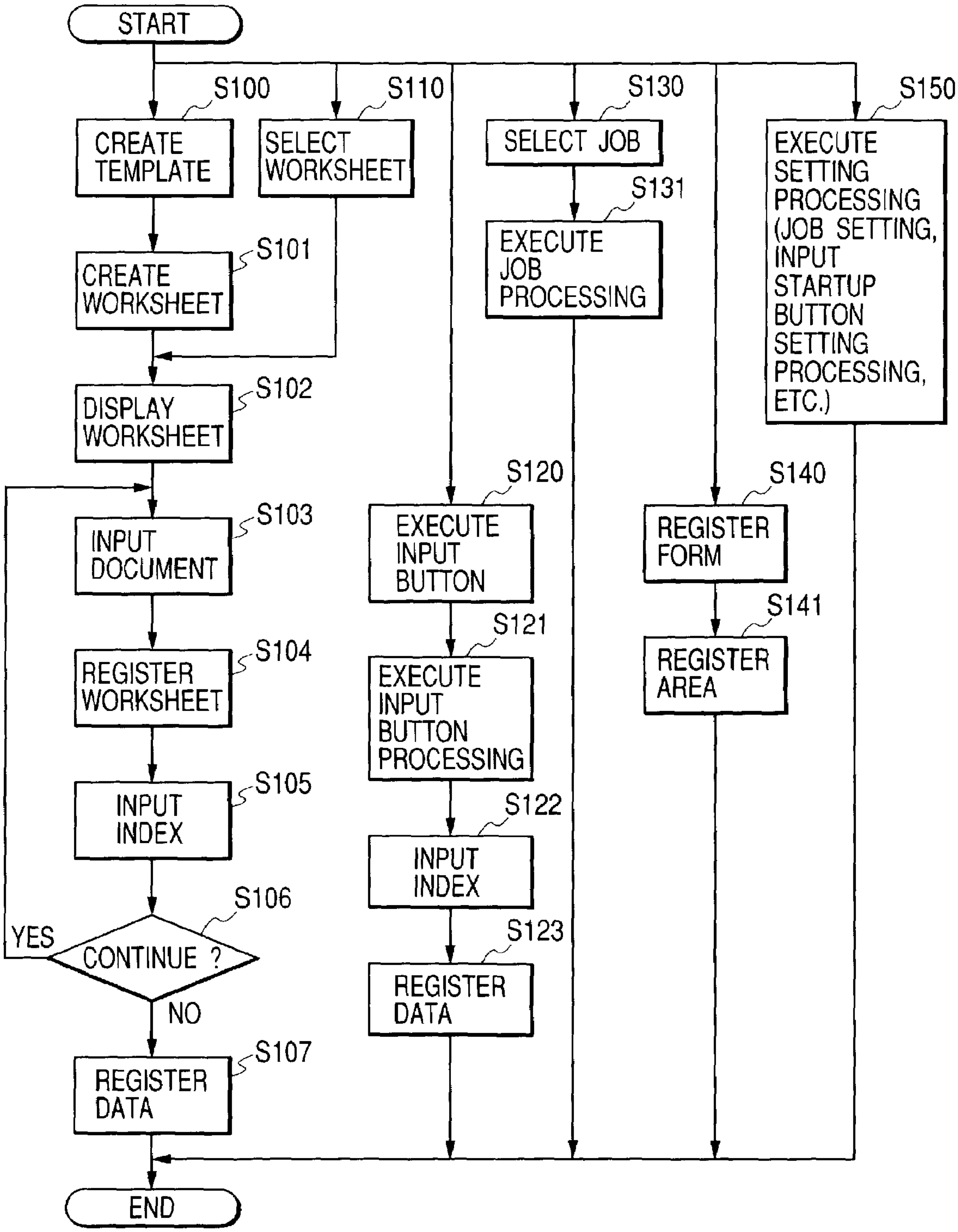
FIG. 3 is a flowchart showing a basic flow in the document registration system.

FIG. 3 is a diagram showing a basic flow in the document registration system 120.

Given herein is an explanation of a processing flow when manually acquiring at first the document (image), thereafter inputting the index (attribute information), and registering the document and the index together in the document management system.

In step S100, an index structure of the database of the document management system is obtained, and a template (modeling form) for creating a worksheet from this index structure is created. This template contains access information to the document management system and schema information (item information that can be used as indexes) created from the index structure. The template creation process will be discussed in detail with reference to FIG. 4.

In step S101, the worksheet is created from the template. This creation processing will be explained in depth referring to FIG. 5. Fields (items) for actually registering the index information and others are set in this worksheet. Further, according to this embodiment, the acquired documents and the index information attached to the documents, are managed in a way that executes a series of processes on a worksheet basis (as in a management table). Note that the worksheet is created from the template created in step S100, however, with an omission of step S100, one of previously created/saved templates is selected, and the worksheet may be created from the selected template.

Further, one of already-created/registered worksheets is selected, and the document information and the index information can be inputted to this selected worksheet. In this case, in step S110, the worksheet chosen by the user among the worksheets stored in the data area 250 is fetched, and processing proceeds to step S102.

In step S102, the worksheet created in step S101 or the worksheet selected in step S110 is displayed on the display.

In step S103, the document acquired from the device is inputted.

In step S104, the document information thereof is registered in the worksheet. To be specific, an inputted document name (document ID) is registered in the item (schema information) of the document name (document ID) in the worksheet, and the document registered in this worksheet can be identified.

In step S105, necessary pieces of index (attribute) information are inputted to the respective items of the worksheet and thus managed. The index information may be manually inputted by the user, and the information automatically obtained from the document by use of an Optical Character Reader (OCR) may also be inputted. The input of the index information will be explained in detail referring to FIG. 10.

In step S106, if required to further input other document, the processing loops back to step S103.

In step S107, the data in the worksheet, which have been obtained and set by the processing described above, undergo release processing (registration processing) to the document management system. Details of the release processing will be explained later on with reference to FIG. 11.

Given next is an explanation of processing in a case where the document input processing is preset to an input startup button (FIG. 8) on Graphical User Interface (GUI), and an execution of this processing is triggered by pressing the input startup button.

In step S120, upon detecting the event that the input startup button is pressed, it is judged what processing is preset to this button. In step S121, there is executed the document acquisition processing (such as processing of acquiring a document stored afresh in the previously specified folder, and processing of acquiring a document image by operating the previously specified scanner to read the original) corresponding to the set condition, and this processing is registered in the preset worksheet. The execution of the input startup button processing will hereinafter be described with reference to FIG. 9.

In step S122, the index is inputted to the worksheet. The index input processing will be explained later on referring to FIG. 10.

In step S123, the data in the worksheet, which have been acquired and set by the processing described above, undergo the release processing (registration processing) to the document management system. The details of the release processing will hereinafter be described referring to FIG. 11.

Further, document acquisition setting, index setting and release setting are specified beforehand and are created/saved as jobs, and the job selected by the user (step S130) from the plurality of jobs saved can be also executed (step S131). The job selection/execution processing will be discussed later on referring to FIG. 13.

Moreover, it is possible to, though explained in depth later on, automatically input the index by use of the form when inputting the index in steps S105 and S122. In step S140, processing of registering this form is implemented and in step S141 an area is set in the form. The form registration processing will be explained in detail with reference to FIG. 6, while the area registration processing will be described in depth referring to FG. 7.

Executed in step S150 are various categories of setting processing (such as the job setting processing (FIG. 12), the input startup button setting processing (FIG. 8), etc) for executing the processing described above.

The processing described above will hereinafter be described in greater detail.

<Template Creation Processing (FIG. 4)>

Figure 4:
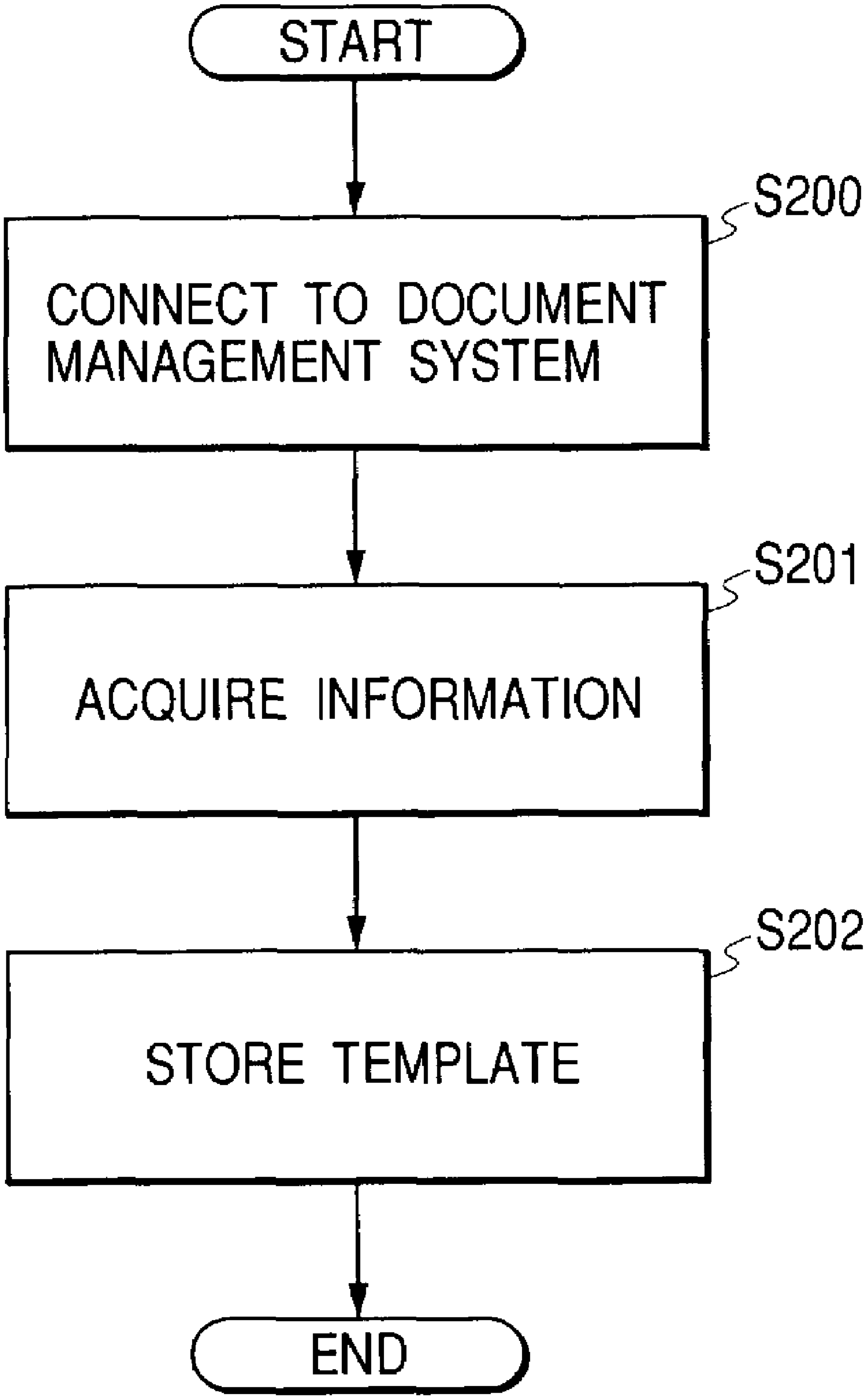
FIG. 4 is a flowchart showing template creation processing.

The template creation processing (step S100) will be described in greater detail referring to FIG. 4.

In step S200, the processing involves at first connecting to the document management system of a destination of the document registration.

In step S201, the index structure (the schema information (operable as indexes for searching) set in the folder etc for storing the documents) of the database in the document management system, is acquired.

In step S202, a template for managing batchwise the information on the connection to the document management system and the schema information, is created and saved in a way that attaches the template with a piece of identifying information (template name) for identifying the thus created template.

<Worksheet Creation Processing (FIG. 5)>

Figure 5:
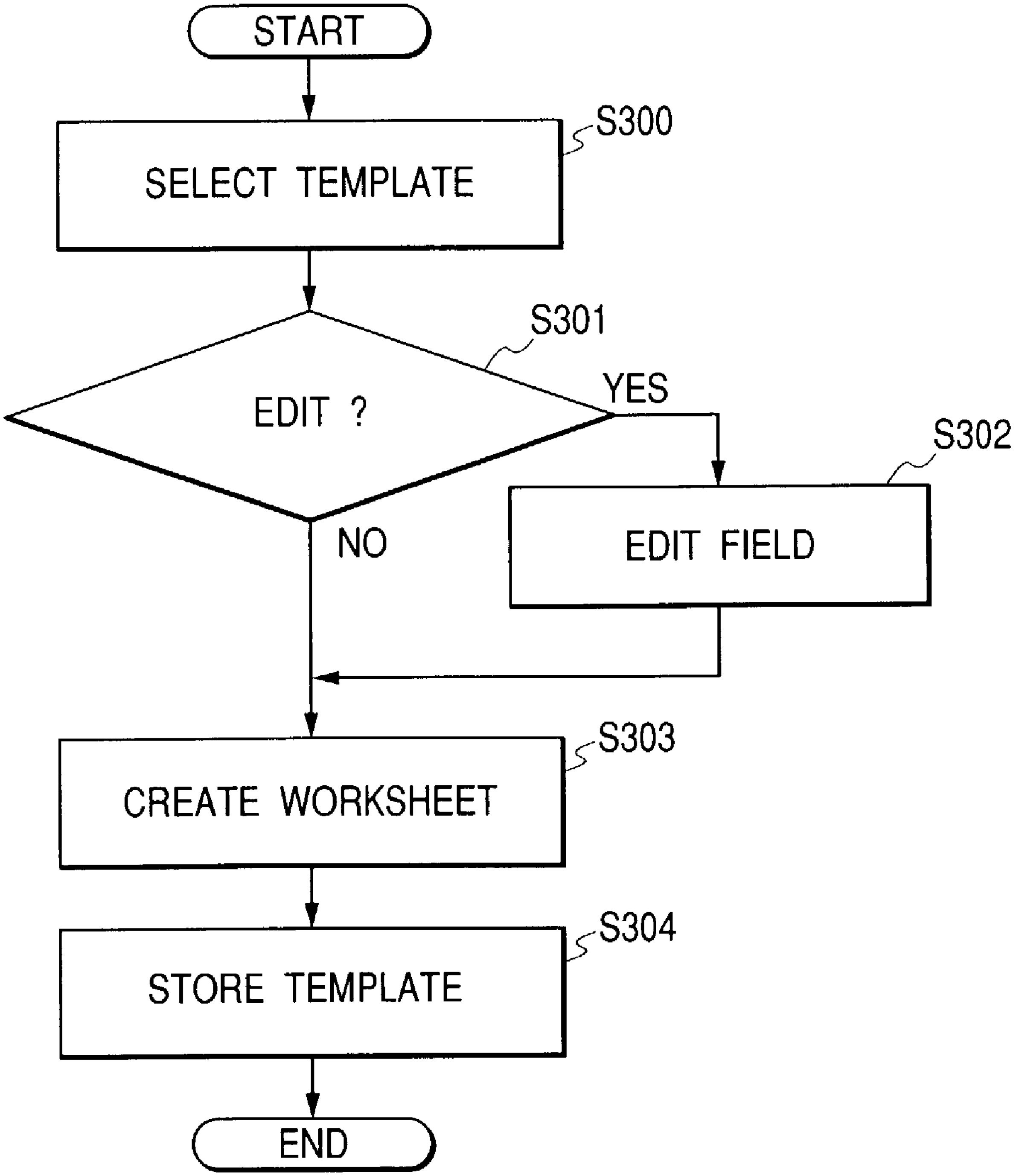
FIG. 5 is a flowchart showing worksheet creation processing.

The worksheet creation processing (step S101) of creating the worksheet from the template saved will be described in depth referring to FIG. 5.

In step S300, to start with, the user is prompted to select the template corresponding to the document management system of the document registering destination. Note that this selection step may be omitted in the case of creating the worksheet directly from the template created in FIG. 4.

In step S301, if a certain item of saved-in-the-template schema information of the document management system does not need index inputting, it is judged whether there is given an indication of whether editing should be done such as selecting a field, as an input target, corresponding to this item of schema information.

In the case of judging that the field edit is carried out, the field edit operation is performed in step S302. This operation is basically an operation of selecting a necessary field among the fields (item areas) of the template that can be used as the schema information, and an indication of extending the field (item area) can be given as the case may be.

In step S303, the predetermined setting such as the field edit etc is confirmed, and the worksheet is created from the selected template.

In step S304, the worksheet is saved in a way that attaches the worksheet with the identifying information (the worksheet name) for identifying the created worksheet.

<Form Registration Processing (FIG. 6)>

Figure 6:
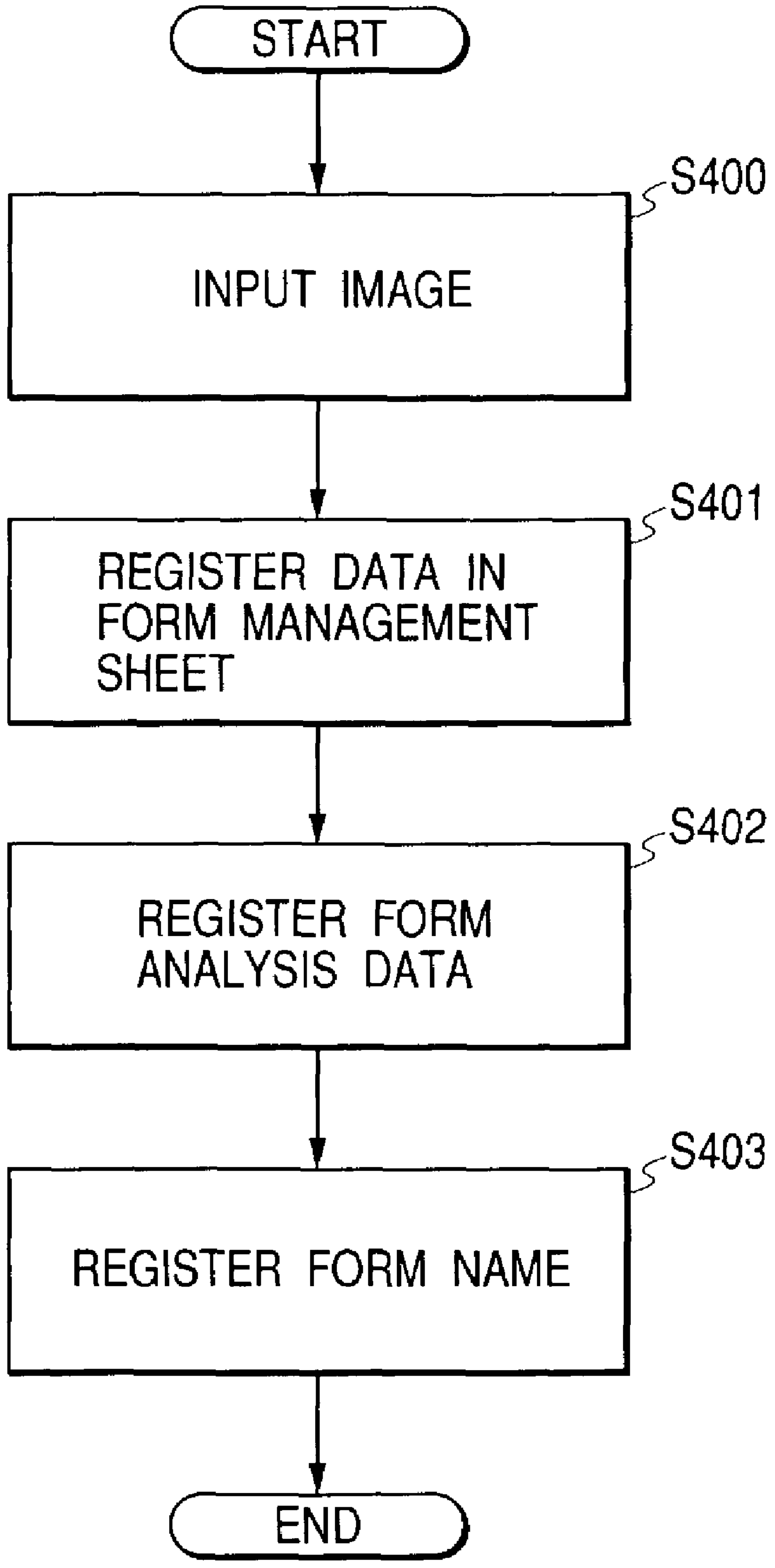
FIG. 6 is a flowchart showing form registration processing.

The form registration processing (step S140) of registering the form used for processing of identifying the inputted document and processing of extracting the information from the image as an index, will be explained in detail with reference to FIG. 6.

In step S400, image data serving as a reference when analyzing the form are obtained.

In step S401, the image data obtained beforehand are registered in a form management sheet for managing the variety of forms.

In step S402, the image data are transferred to the form analysis part 226 for executing form analysis processing (of analyzing pieces of information about positions and sizes of a frame and a table configuring the form), wherein the form analysis processing of the image data is executed. Then, a result of the form analysis is registered mapping (corresponding) to the same image data in the form management sheet, which are managed as registration form data 252.

In step S403, a newly added item of registration form data is attached with identifying information (a form registration name) and thus saved.

<Area Registration Processing (FIG. 7)>

Figure 7:
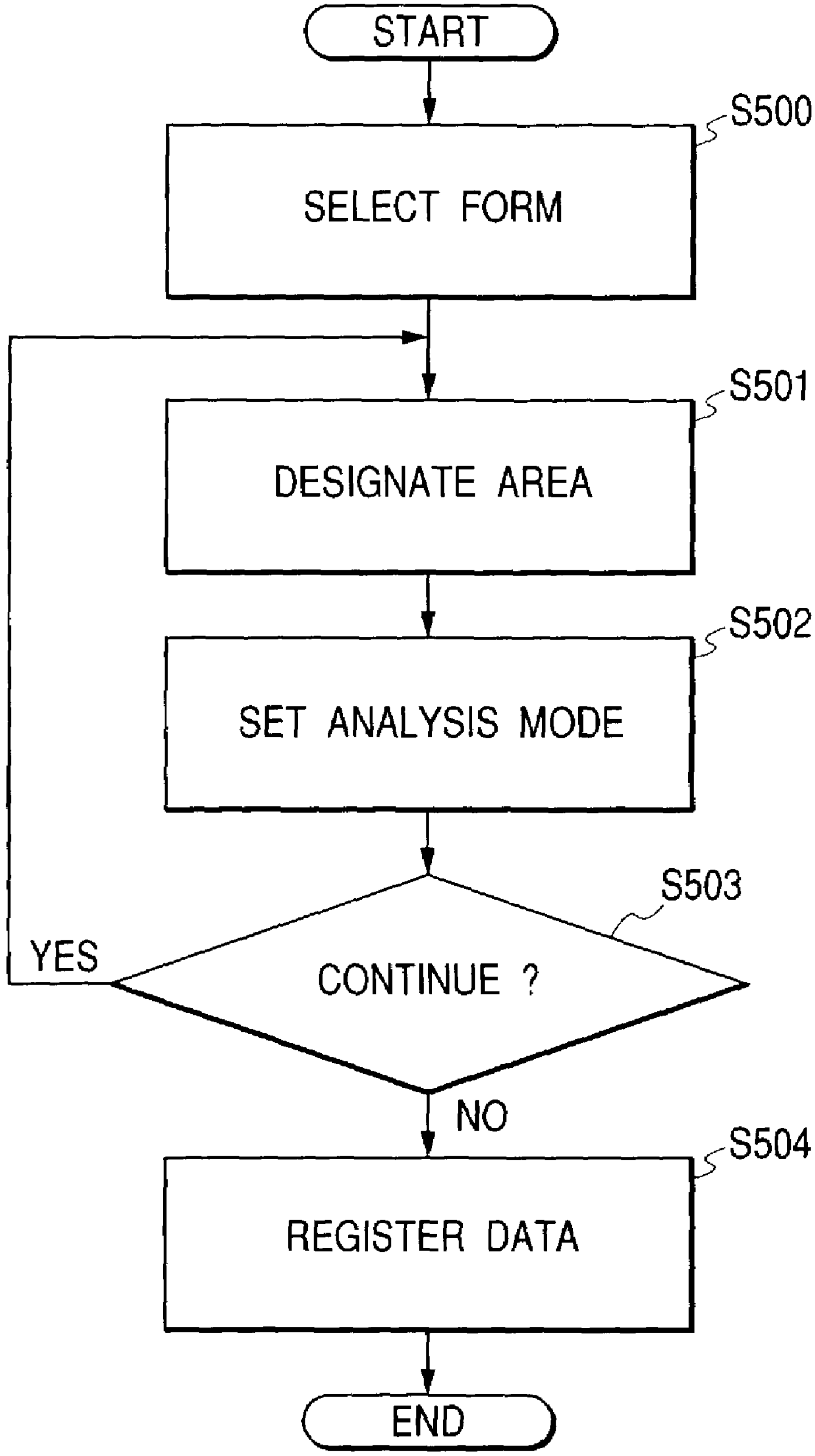
FIG. 7 is a flowchart showing area registration processing.

The area registration processing (step S141) of setting an area for character recognition and barcode recognition on the registration form, will be explained in depth referring to FIG. 7. This area is used for registering a result of the recognition as an index on the worksheet by executing the recognition processing about within the document area corresponding to the area set on the registration form when indexing the document.

In step S500, at first, the user is prompted to select the form for setting the area.

In step S501, the user is prompted to specify an area serving as a form analysis target area.

In step S502, an analysis mode for this area is specified. Detailed conditions for improving a recognition rate are set as the analysis mode. For example, kana/kanji character recognition and an analysis engine for the barcode recognition etc can be specified for every area. Further, mappings of the areas to the template fields (worksheet fields) can be herein set, wherein when analyzing and registering the document image, the result of recognition of each area is inputted as an index into the worksheet field mapping thereto. Note that the mappings of the areas to the worksheet fields (template fields) may be changed when executing the index input processing.

In step S503, it is judged whether there is given an indication of setting other area, and, if indicated to set other area, the processing loops back to step S501. Whereas if the area setting comes to an end, the processing proceeds to step S504.

In step S504, the setting information on the set area is registered as added information to the registration form data.

<Input Startup Button Setting (FIG. 8)>

Figure 8:
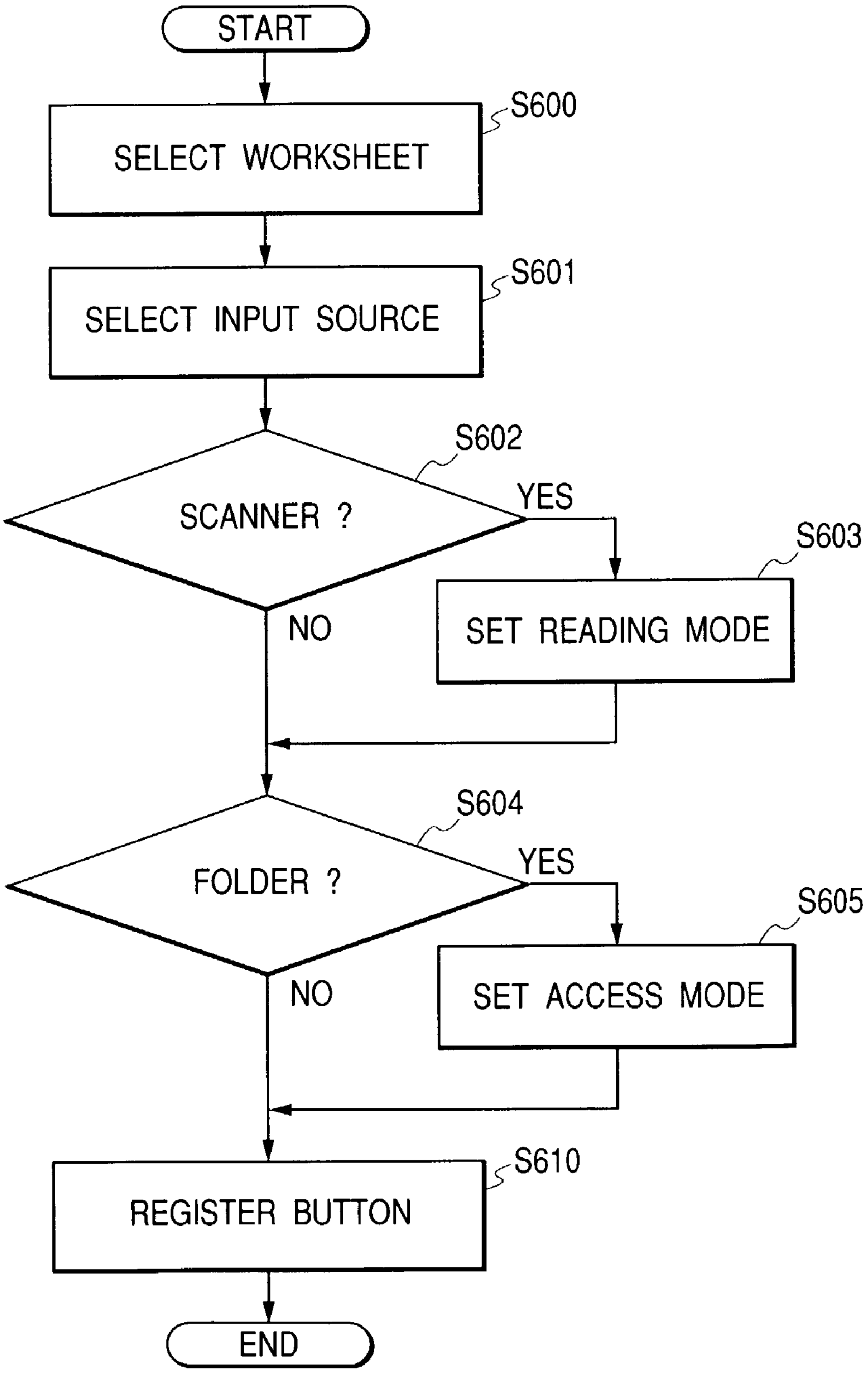
FIG. 8 is a flowchart showing input startup button setting processing.

The input startup button setting processing (step S150) will be described in detail with reference to FIG. 8. The input startup button is used for, when pressed, having input processing from various categories of data sources (such as the folder, the scanner and so on) processed batchwise.

In step S600, the user is prompted to select the worksheet for registering the document acquired from the set data source when the input startup button is pressed.

In step S601, the user is prompted to select the data source (the folder, the scanner etc) from which the document data are acquired.

In step S602, it is judged whether the scanner is specified as the data source and, if the scanner is specified, a scanner reading mode (a reading resolution, a reading area etc) is set in step S603.

In step S604, it is judged whether the folder is specified as the data source and, if the folder is specified, folder access setting (access conditions such as setting an access right) is conducted in step S605.

In step S610, the set conditions are registered mapping to the input startup button is displayed (as an icon) under a GUI environment. Further, a plurality of input startup buttons may be registered and displayed by changing a name and a configuration of the button in accordance with the setting conditions.

<Input Startup Button Execution Processing (FIG. 9)>

Figure 9:
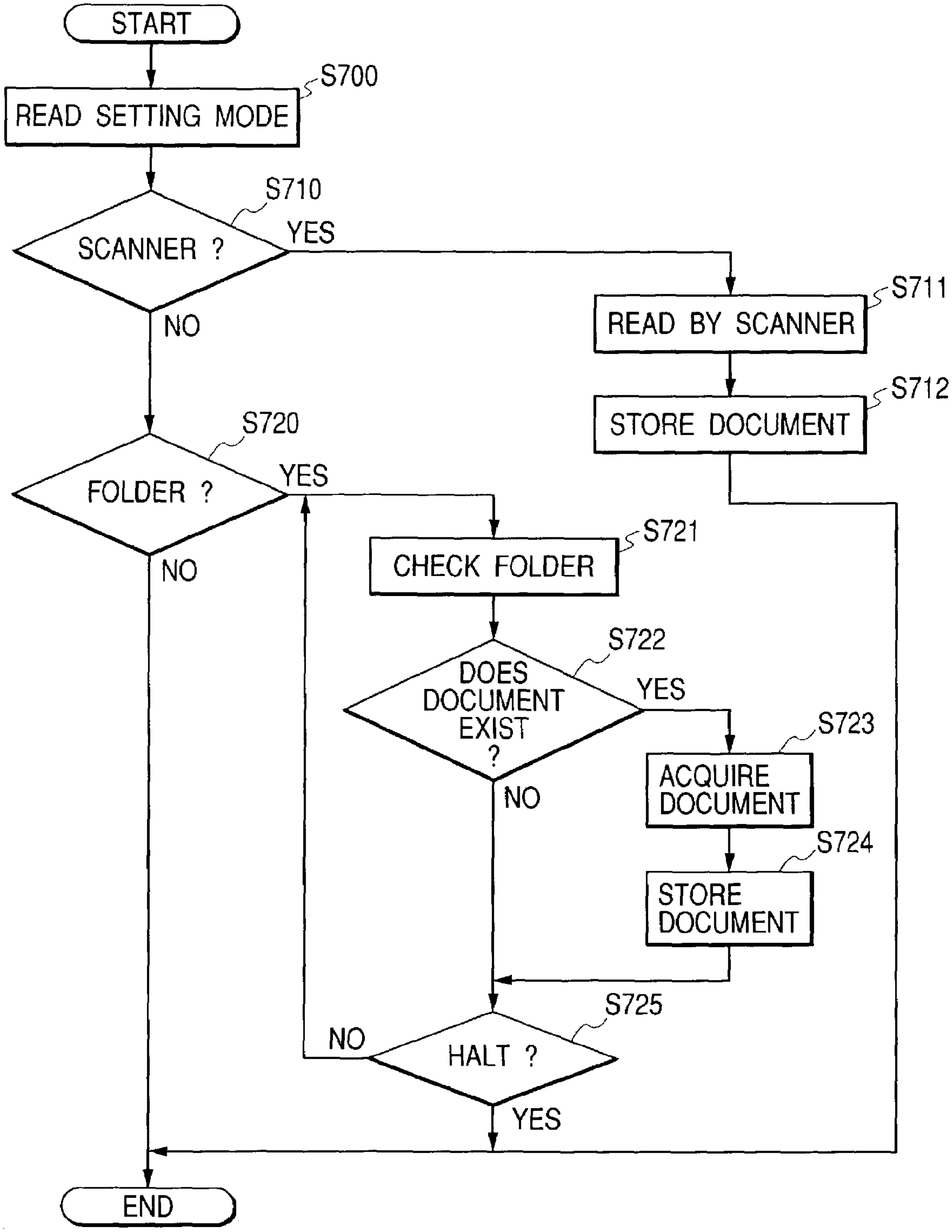
FIG. 9 is a flowchart showing input startup button execution processing.

The execution processing (step S121) when the input startup button is pressed, will be explained in detail referring to FIG. 9.

In step S700, the conditions (setting mode) set in the pressed input startup button are read out.

In step S710, it is judged whether the scanner is specified. If the scanner is specified, the processing proceeds to step S711, wherein the document image is acquired by carrying out a scan based on the scanner reading condition set as the setting mode. In step S712, the document concerned is saved on the worksheet.

In step S720, it is judged whether the document acquisition from the folder is set. If the acquisition from the folder is set, the processing goes to step S721, in which contents of the folder are checked based on conditions (e.g., a condition for obtaining a newly inputted document, and a condition for obtaining a preformatted document) of the document acquisition from the folder. It is judged in step S722 whether there exists a document that meets these conditions. If such a document exists, this document is obtained in step S723 and saved on the worksheet in step S724. Whereas if judging in step S722 that there exists no document that satisfies the conditions, the processing advances to step S725.

Step S725 is judgment processing used when such a condition as to acquire the document by periodically checking (polling) the folder is set. If indicated to halt the periodic folder check or if the setting condition for the periodic folder check is not initially done, the judgment processing is terminated. Whereas if not, the processing goes back gain to step S721, wherein the processing of periodically checking the contents of the specified folder is executed.

<Index Input Processing (FIG. 10)>

Figure 10:
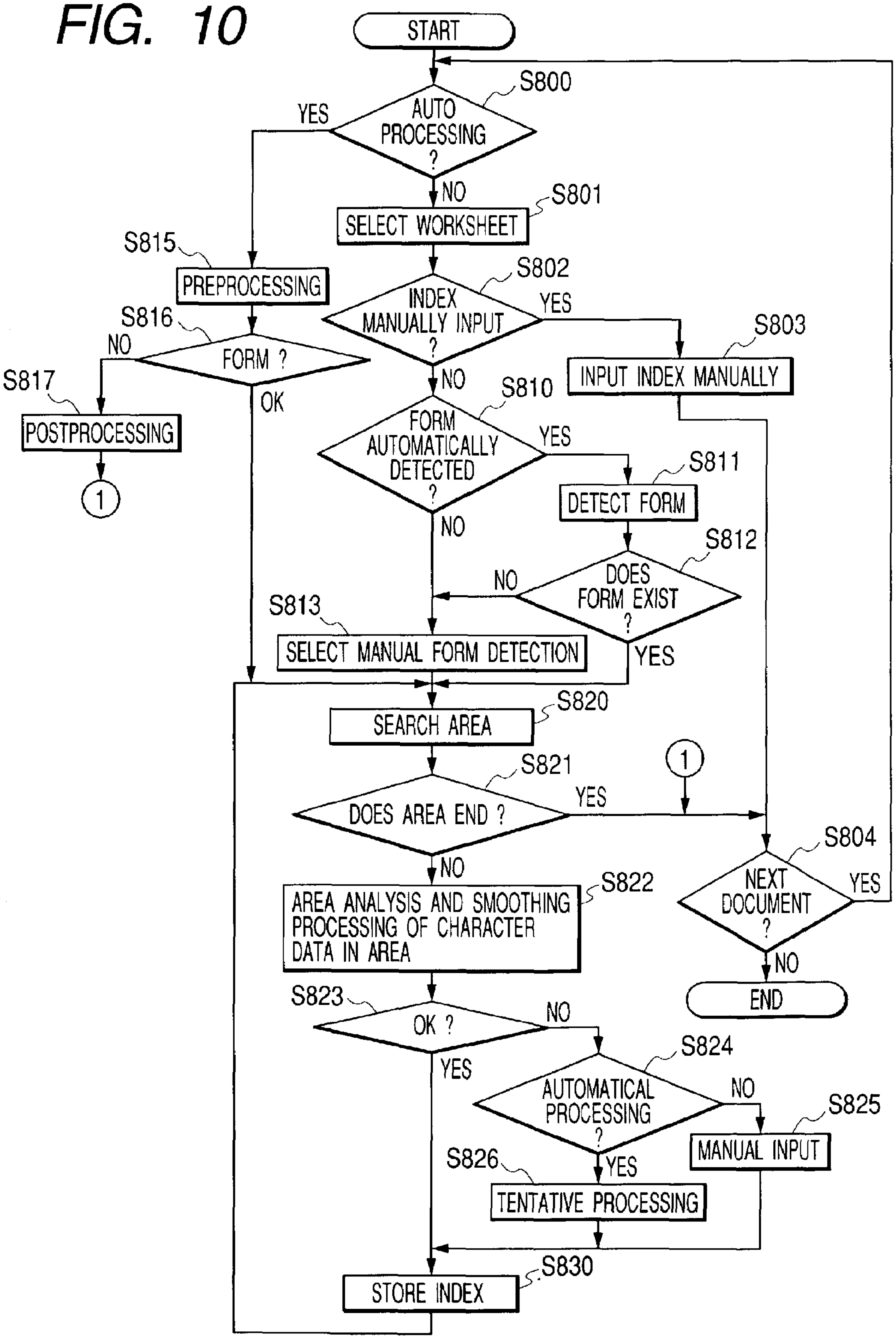
FIG. 10 is a flowchart showing index input processing.

The index input processing (steps S105, S122, S1121) of inputting the document index onto the worksheet will be described in depth referring to FIG. 10.

In step S800, it is judged whether specified to executed the automatic processing such as the job etc. In the case of the automatic processing, the processing diverts to step S815. Whereas if not, the worksheet and the form are selected in sequence.

If not specified to execute the automatic processing, the user specifies the worksheet in step S801, thereby selecting the worksheet.

In step S802, it is judged whether the index is inputted manually by the user or by use of the registration form. If indicated to input the index information manually by the user, the manual index input is executed in step S803. Thereafter, it is judged whether there are still other documents that should be processed in step S804. If judging that there are such other documents, the processing loops back to step S800. If not, the processing comes to an end.

While on the other hand, if judging in step S802 that the indication is given so as to implement the index input using the registration form, the processing proceeds to step S810, wherein it is judged whether an automatic form detection function is utilized or not. if it if judged that the indication of utilizing the automatic form detection function is given, form detection processing of detecting a form coincident with the inputted document among the plurality of registration forms registered, is executed in step S811. If the coincident form is detected by the form detection processing, the processing advances to step S820 from step S812. Whereas if the coincident form is not detected, the processing moves to step S813 from step S812. While on the other hand, if judging in step S810 that the utilization of the automatic form detection function is not indicated but the manual form selection is indicated, the processing proceeds to step S813. In step S813, a desired form is manually selected from among the plurality of registration forms by a user's indication.

In step S820, there is searched an area in which the automatically detected or manually selected registration form is set.

In step 821, it is judged whether there is finished the indexing processing that uses the information in the areas corresponding to all the areas set in the registration form with respect to the document concerned. If finished, the processing diverts to step S804, wherein it is judged whether there is a next document. Whereas if not finished, the processing proceeds to step S822.

In step S822, the area is analyzed according to an analysis condition of the area set in the registration form. Note that the user is herein able to positively adjust an area range set as the area analysis condition. The adjustment of the area range is that the area range set as the analysis condition of the set area is displayed overlapped with a rectangular shape assuming a predetermined color in a state of displaying the inputted document image, and the user can adjust the area range by adjusting this rectangular shape. Further, a segment of image data cut out according to the area range undergoes character image smoothing processing (smoothing processing of smoothing edges of a cluster of black pixels). The character image connoted herein includes whatever transfers meanings in configuration of bit arrays of bitmap of the barcode data, the pictorial characters and so on. Note that the smoothing processing of the character image is comprehended in the form of library software by the OCR control part 225. Jaggies (scatter in dots) occurred when executing image processing such as an inclination correction, a deviation correction a variable correction and so on, are reduced by effecting the smoothing processing, whereby the recognition rate of the character recognition processing can be improved.

In step S823, it is judged whether successful without any occurrence of abnormality in the area analysis processing. In the case of an abnormal end, the processing proceeds to step S824, wherein it is judged whether it is an automatic processing mode. If not the automatic processing mode, the user is prompted to manually input the index in step S825. In the case of the automatic processing mode, tentative processing is carried out in step S826. The tentative processing connoted herein is processing of attaching an NG mark indicating that, e.g., the area analysis ends up with a failure and outputting a value specified as other default value by way of an index.

In step S830, the result of executing the area analysis processing is stored on the worksheet, and the processing returns to step S820, in which other unprocessed area is searched for.

Whereas if judging in step S800 that the automatic processing of the job etc is specified, the worksheet set to the automatic processing is selected in step S815, and preprocessing of the automatic indexing processing is carried out. The premise herein is that the worksheet is preset to the automatic processing. If the registration form is also set to the automatic processing, it is assumed that the form has been detected directly in step S816, and therefore the processing proceeds to step S820. Further, if the setting that the registration form is automatically detected and selected is done in this automatic processing, the same form detection processing as in step S811 is executed in the preprocessing thereof. If the coincident registration for is detected, it is assumed that the registration form has been detected in step S816, and therefore the processing proceeds to step S820. By contrast, if the registration is not established, the processing diverts to post-processing of step S817, wherein the document concerned is managed on the worksheet as a document that could not be processed. Then processing advances to step S804, wherein it is judged whether a next document is to be processed or not. Note that with respect to the document unable to undergo this processing and managed on the worksheet, the user can invoke this worksheet and manually attach an index mapping to this document.

<Release (Data Registration) Processing (FIG. 11)>

Processing (S107, S123, S1131 etc) of releasing (registering) pieces of data (document information and index information) managed on the worksheet to the document management system, will be explained in detail with reference to FIG. 11.

In step S900, it is judged whether an automatic release is specified. If judging that the automatic release is specified, the processing diverts to step S901. Whereas if not, the processing proceeds to step S910.

In the case of the automatic release, pieces of setting information (such as information on a connection to the document management system as a destination of registration, folder information of the destination of registration and others) of the automatic release, are obtained from the worksheet. In step S902, connection processing to the storage folder of the document management system is executed, and the processing advances to step S920, wherein the data to be released are prepared.

If the automatic release is not specified, in step S910, it is possible to set that a registration target document is at first selected from among the documents managed on the worksheet and how the documents stored in the document registration system after being registered in the document management system, should be treated (deleted and so on). The registration target document is selected in a way that displays, in a table format of the worksheet, the document IDs of the plurality of registration target documents managed on the worksheet and the indexes mapping to the respective documents, and prompts the user to select a registration processing target document from among those documents. Note that the document ID and the index selected on the worksheet are highlight-displayed when in the selection processing, which is easy to recognize that these elements are being selected.

In step S911, login processing to the document management system as the destination of registration is executed, and a folder for storing the document is specified.

In step S912, options for the document registration can be set, and it is possible to set that an execution log related to the document registration processing is taken and to set a conversion of the document format for the document registration.

In step S920, the document information etc to be registered in the document management system is cached in the data area 254 for outputting, thus making a preparation for the registration.

In step S930, it is judged whether there is given an indication of the format conversion of the document image to be registered or an indication of processing of adding a result of effecting an OCR analysis of the document image. In the case of judging that this indication is given, the image processing is executed based on this indication in step S931.

In step S940, the prepared document data etc undergo processing of being registered in the folder of the document management system as the destination of registration.

In step S950, it is judged whether there is indicated a deletion of the document stored in the document registration system after the document registration in the document management system. if the deletion thereof is indicated, the delete processing of the document concerned is implemented in step S951, and the release processing is finished.

<Job Creation Processing (FIGS. 12 and 18)>

Figure 12:
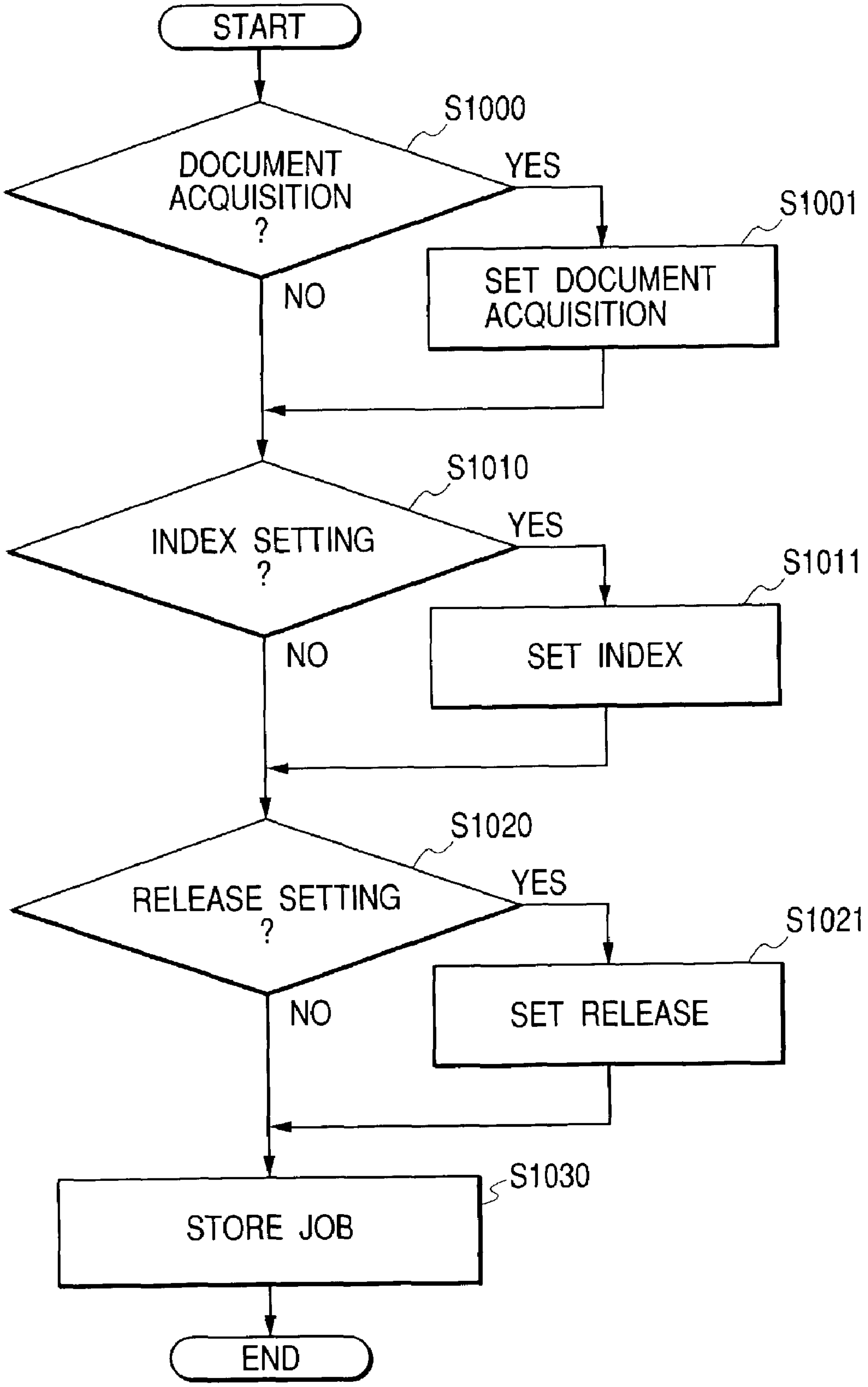
FIG. 12 is a flowchart showing job generation processing.

The processing (S150) of creating one job by establishing the respective settings of the document acquisition process, the index processing and the release processing, will be described in depth referring to FIG. 12.

In step S1000, it is judged whether job setting for the automatic document acquisition is specified. If specified, the processing proceeds to step S1001, wherein the setting for the document acquisition is done by setting the worksheet for use and specifying the scanner as a source device and the folder.

In step S1010, it is judged whether the setting of the automatic process for the index input is indicated or not. If indicated, in step S1011, there are set items required for automatically executing the index processing such as setting the worksheet for use, specifying the registration form or specifying the automatic search for the registration form and so forth.

In step S1020, it is judged whether the setting of the automatic release (document registration) is indicated. Is indicated, in step S1021, there are set necessary items of information for executing the automatic release processing, such as the processing target worksheet, a destination of document registration (the document management system, the folder) and the way of dealing with the document after being registered.

In step S1030, pieces of setting information set in steps S1001, S1011 and S1021 are stored in a way that attaches pieces of identifying information (names of jobs) thereto.

Note that a plurality of jobs with a combination of the variety of settings can be registered and stored.

Given next is an explanation of a case of setting the automatic processing by use of this job creation processing. In the case of setting the automatic processing, the document acquisition setting, the index setting and the release setting are all set.

Figure 14:
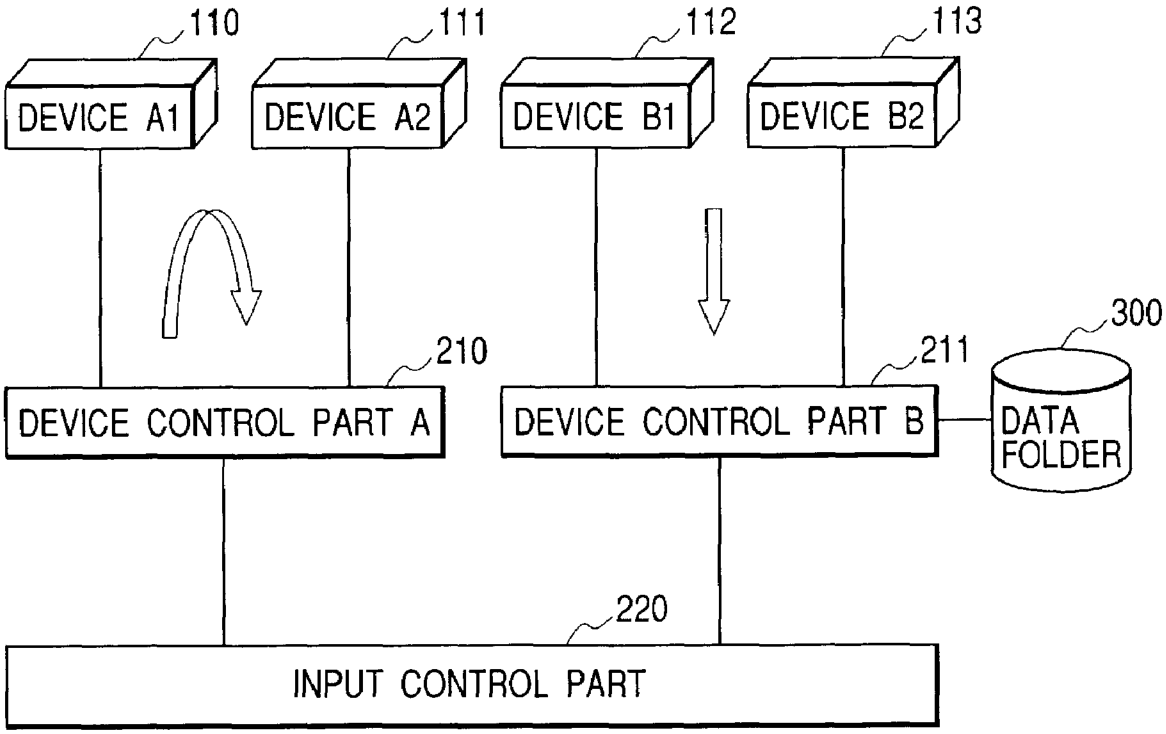
FIG. 14 is a diagram showing an extended device control part.

According to the automatic processing of the present invention, as will be explained later on referring to FIG. 14, the assumption is that the document is cached in a data folder 300 in order to correspond to the case where the documents are transmitted by the push technique from the plurality of devices. Therefore, the document acquisition setting (S1001) in the automatic processing involves periodically checking that a new document is cached in this data folder 300 and, when cached, acquiring this document. Note that the user's operation for the document acquisition setting may be omitted when only one data folder 300 is provided. Then, the user sets the automatic processing setting (S1011) for the index input and the automatic release setting (S1021). These settings are indispensable for this embodiment, and hence, for instance, GUI designed to indicate the user to input without any failure according to a Wizard function, is utilized. Thus, there is set the job of the automatic processing of the document transmitted by the push technique.

Figure 18:
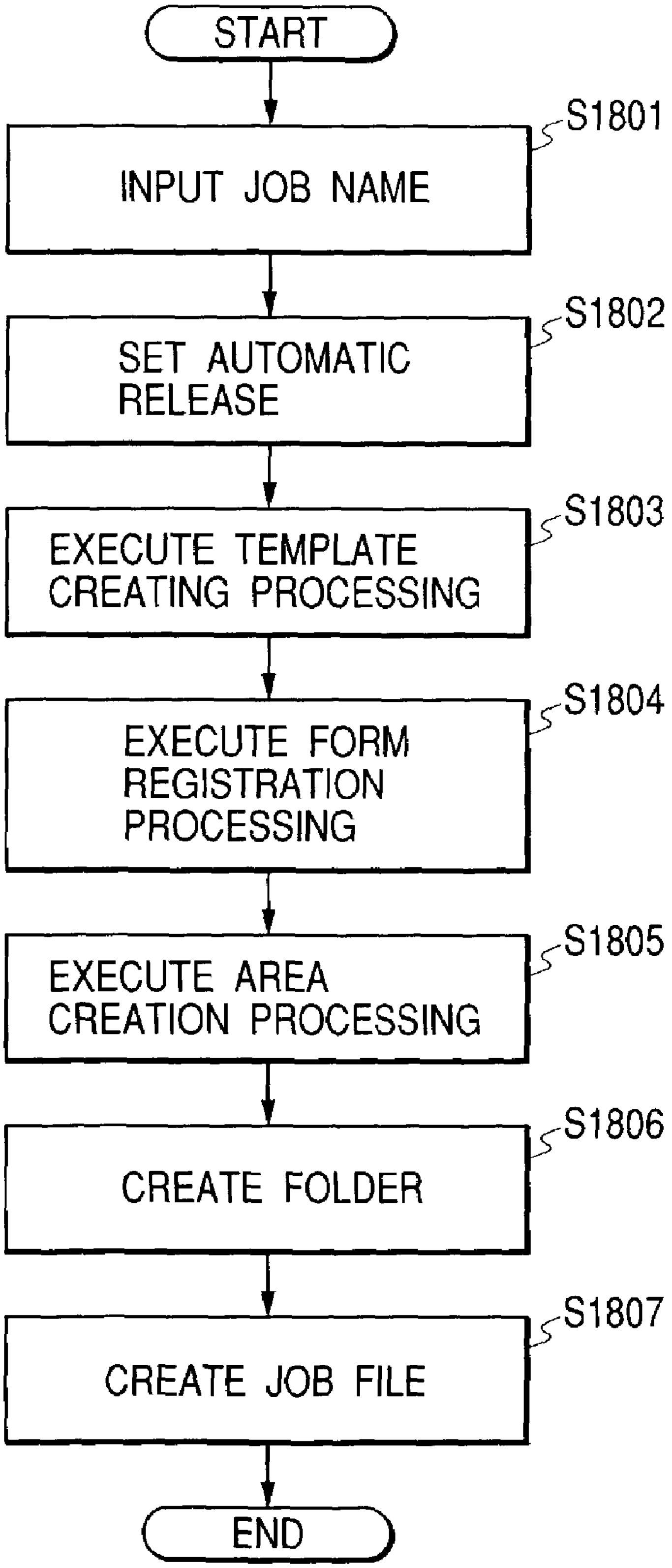
FIG. 18 is a flowchart showing detailed creation processing of an automatic processing job.

A detailed generation flow of the job of the thus created automatic processing will be explained with reference to FIG. 18. The device transfers the document image to the folder of the document registration system on the basis of a general transfer protocol such as FTP (File Transfer Protocol) etc. It is assumed that the device is capable of transferring the document image by specifying the folder. The document registration system always monitors (an address of) the folder with the automatic processing job set therein, and sets to start processing upon detecting that a new document image is transferred.

In step S1801, a job name of the job that will herefrom be generated is inputted. According to this embodiment, the job is stored as a job file, and hence the name inputted herein is used as a job file name and a folder name (serving also as a name of the data folder 300) generated corresponding to this job.

In step S1802, the automatic release in this job is set. Based on information of a release destination selected herein, template creation processing is executed in step 1803. FIG. 4 already shows this processing.

Further in step S1804, a form used for the automatic processing is selected or registered afresh, and an area for the recognition processing using OCR etc is set with respect to this form in step S1805. Note that the form is fixedly set for the automatic processing job in steps S1804 and S1805, however, if the automatic index processing is executed by automatically identifying the form from among the plurality of forms that have already been registered, steps S1804 and S1805 may be omitted.

In step S1806, the job name and the folder having the same job name are created. It follows that the folder created herein is monitored by the job in the process of being now generated, and, when the document image is stored in this folder, the document is indexed by automatically executing the recognition processing based on the set job and, it follows, registered in the document management server.

In step S1807. A job file for storing contents set in S1801 through S1806 is created, and processing comes to an end after saving this setting.

Note that as for the automatic processing job also, a plurality of jobs can be set.

<Job Execution Processing (FIG. 13)>

Figure 13:
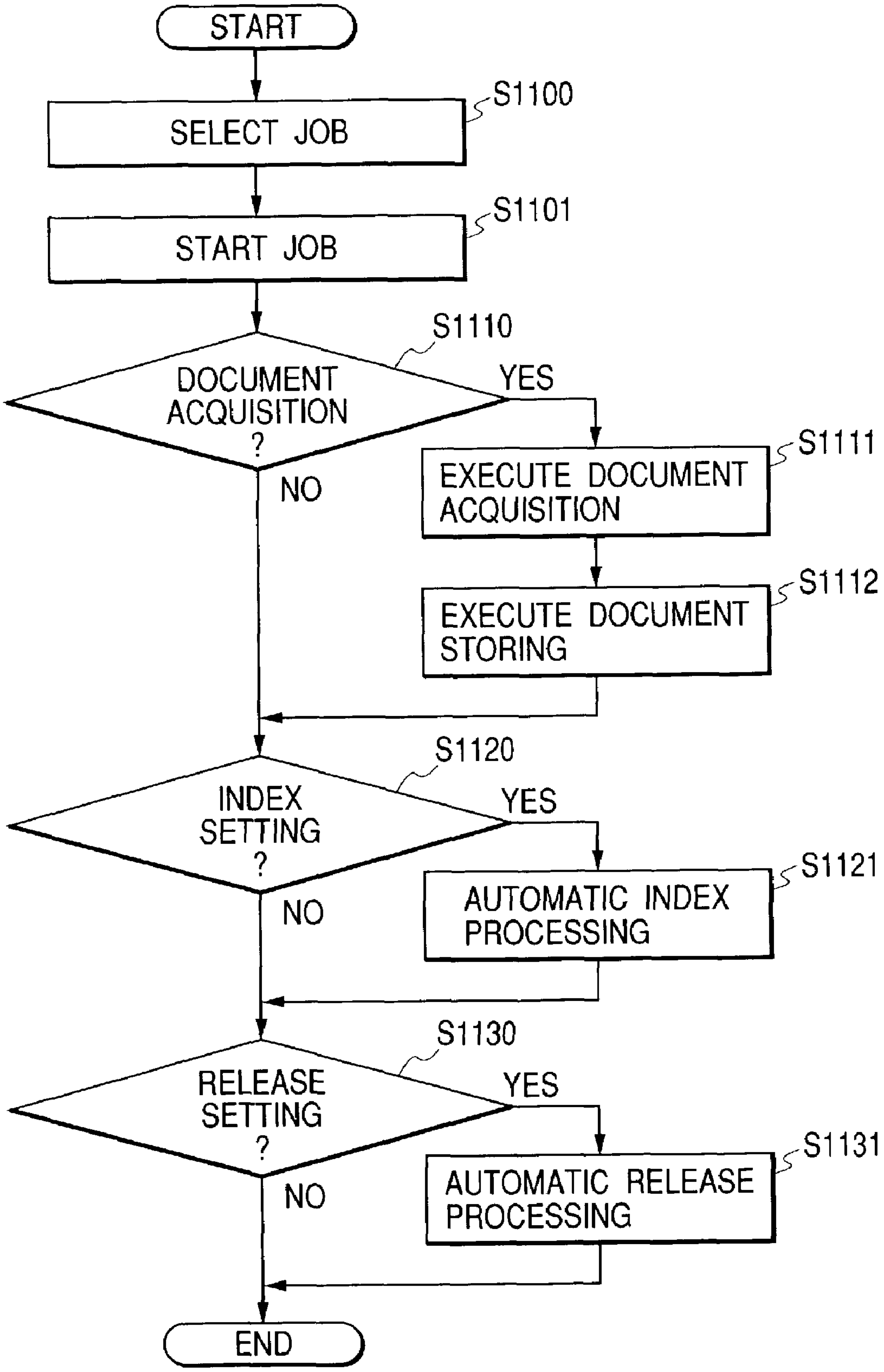
FIG. 13 is a flowchart showing job execution processing.

The job execution processing (S130, S131) will be explained in detail referring to FIG. 13.

In step S1100, conditions set to the selected job are read, and the hob execution processing is started. In the case of the job for automatically processing the document transmitted by the push technique from the device according to the present invention, the following processing is carried out just when the document transmitted by the push technique is stored in the data folder 300.

In step S1110, it is judged whether an automatic document acquisition job is set. If this job is judged to be set, the document acquisition processing of acquiring the document from the device on the basis of the setting is executed in step S1111, and the acquired document is managed and stored on the worksheet in step S1112.

In step S1120, it is judged whether the automatic processing for the index input is set. If judged to be set, the automatic index processing is executed based on the set condition in step S1121. If the automatic form detection is conducted in this automatic index processing, the image processing such as the variable correction, the positional deviation correction etc is effected, and further the information on the document image is obtained based on the setting in the area (field). Moreover, the image information undergoes the smoothing processing, and thereafter the character recognition (OCR) processing is executed, whereby the index data based on the text data can be automatically created.

In step S1130, it is judged whether the automatic release (document registration) processing is set. If this processing is judged to be set, the automatic release processing to the document management system is executed based on the set condition in step S1131.

The document acquisition processing through document registration processing are set in the job, thereby enabling a series of processing to be processed batchwise.

<Extended Device Control Part (FIG. 14)>

According to this embodiment, as the system for obtaining the document from the device, the device control in FIG. 2 can be further extended corresponding to a plurality of modes. This extended device control will be explained referring to FIG. 14.

A device control part A (210) accesses the device from the document registration system, thereby acquiring the document. The document data can be acquired from a plurality of devices (110, 111) adapted to an equal access acquisition method by use of this control part A.

A device control part B (211) is accessed not from the document registration system but from the device, thereby acquiring the document transmitted. In this case also, the document can be acquired from a plurality of devices (112, 113) adapted to an equal accessing method.

Further, the device control part B is provided with its own data folder 300 in order to correspond to document transfer processing simultaneously from the plurality of devices. Further, there is made a scheme enabling this data folder 300 to be structured as a hierarchical folder, wherein the document transfer processing with a folder path specified from the device is also set possible. Note that the use of the general-purposed file transfer protocol (FTP) as an access protocol in this case, facilitates a corresponding operation of the device and also enables the document to be transferred from a general computer.

Further, there is provided a means capable of acquiring, on the occasion of acquiring the document data, pieces of attached (attribute) information (e.g., owner information of each document, source information in the case of a received-by-fax document, information on the connection device and so on) related to the document data concerned other than the document image, and utilizing the data thereof within the system.

An input control part 220 is capable of handling sets of the document data in unification so as not to be confused, which have been acquired by the respective device control parts.

<Extended Document Management System Control Part (FIG. 15)>

Figure 15:
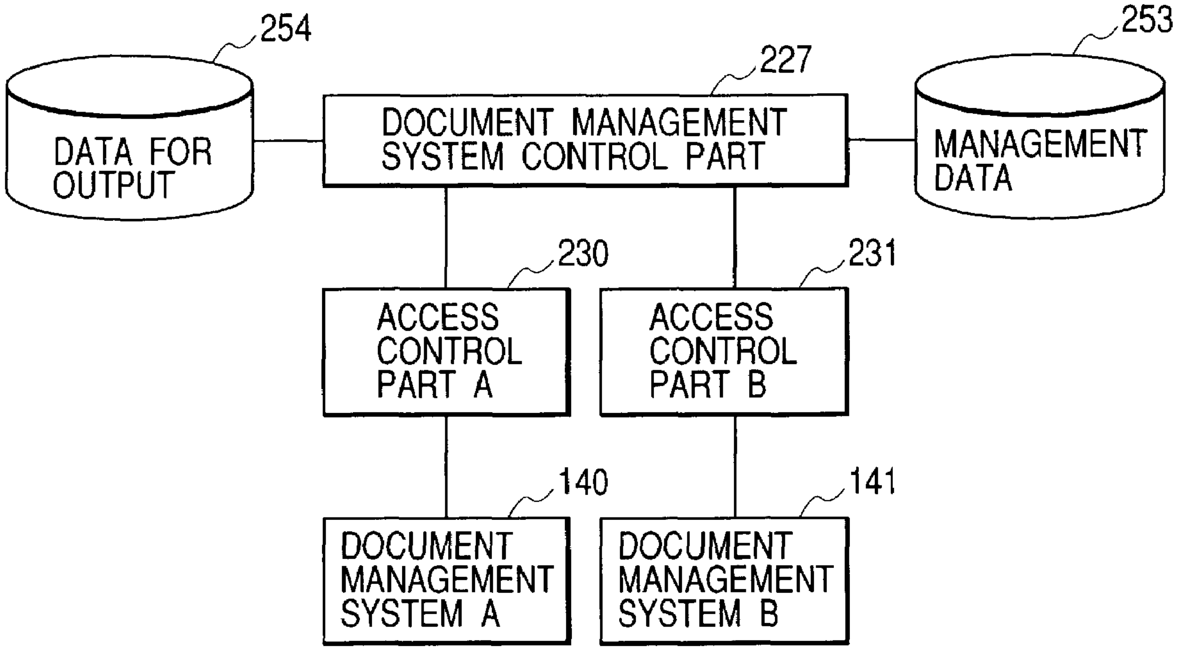
FIG. 15 is a diagram showing an extended document management system control part.

According to this embodiment, a plurality of document management systems for managing the documents in a variety of different formats can be so extended as to be capable of registering the document data acquired from the devices and the indexes (attached information) thereof. FIG. 15 is an explanatory diagram showing a way of corresponding to a case where a document management system A and a document management system B which manage the documents in different formats, coexist on the network.

Herein, it is general that an access means and a file format of a processable document are different depending on the type of the document management system, and therefore the document management system A (140) is provided with the access control part A (230), while the document management system B (141) is provided with the access control part B (231). Then, the document registration system 120 can correspond to a case where the plurality of document management systems for managing the documents in the different formats coexist, by changing the access control part to be used corresponding to the document management system of a destination of registration.

Note that the information required for accessing each document management system is retained as management data 252 and fetched and used as the necessity arises.

Figure 11:
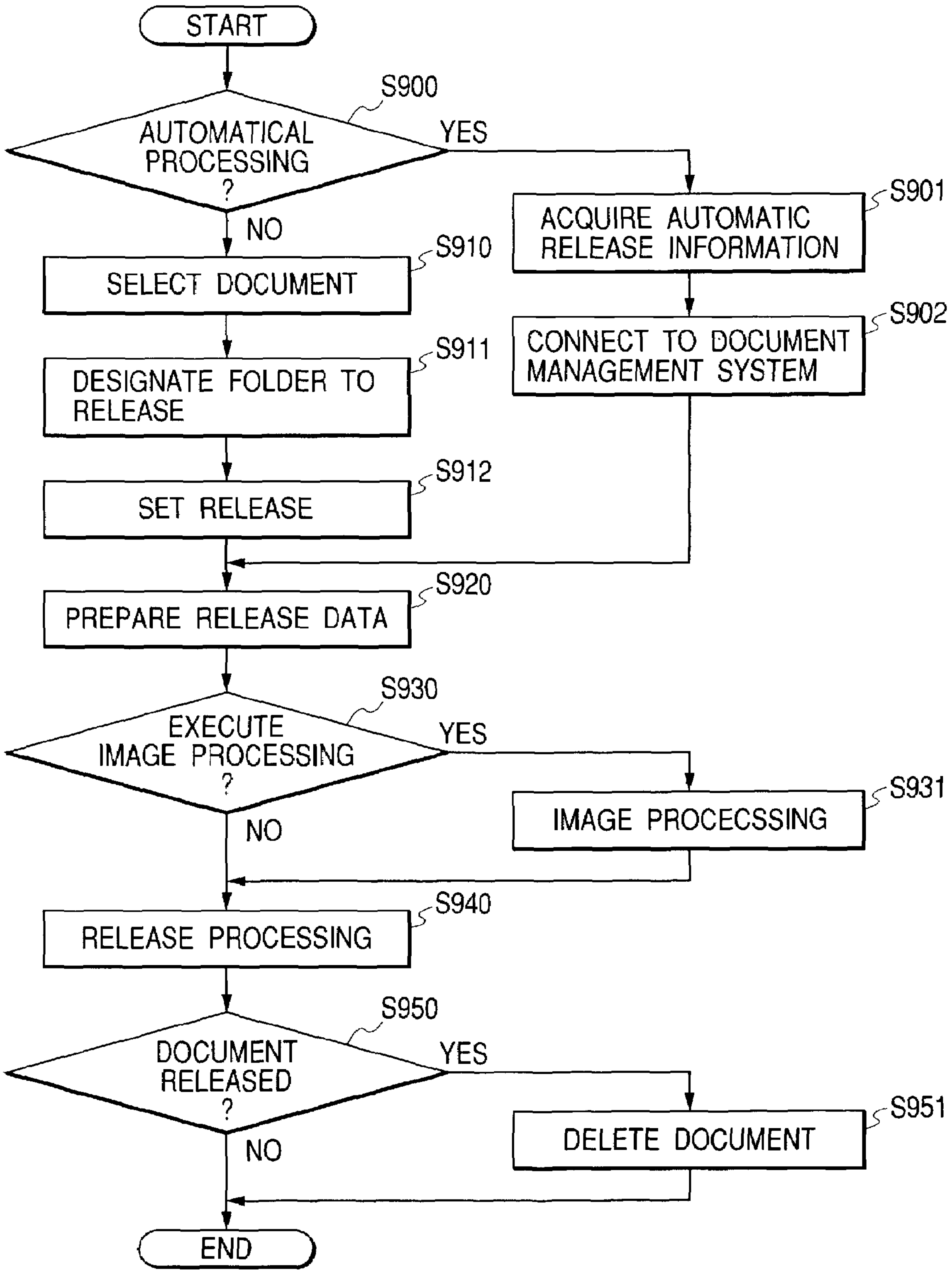
FIG. 11 is a flowchart showing release (data registration) processing.

<Supplement (FIG. 16) to Release Processing in FIG. 11>

Figure 16:
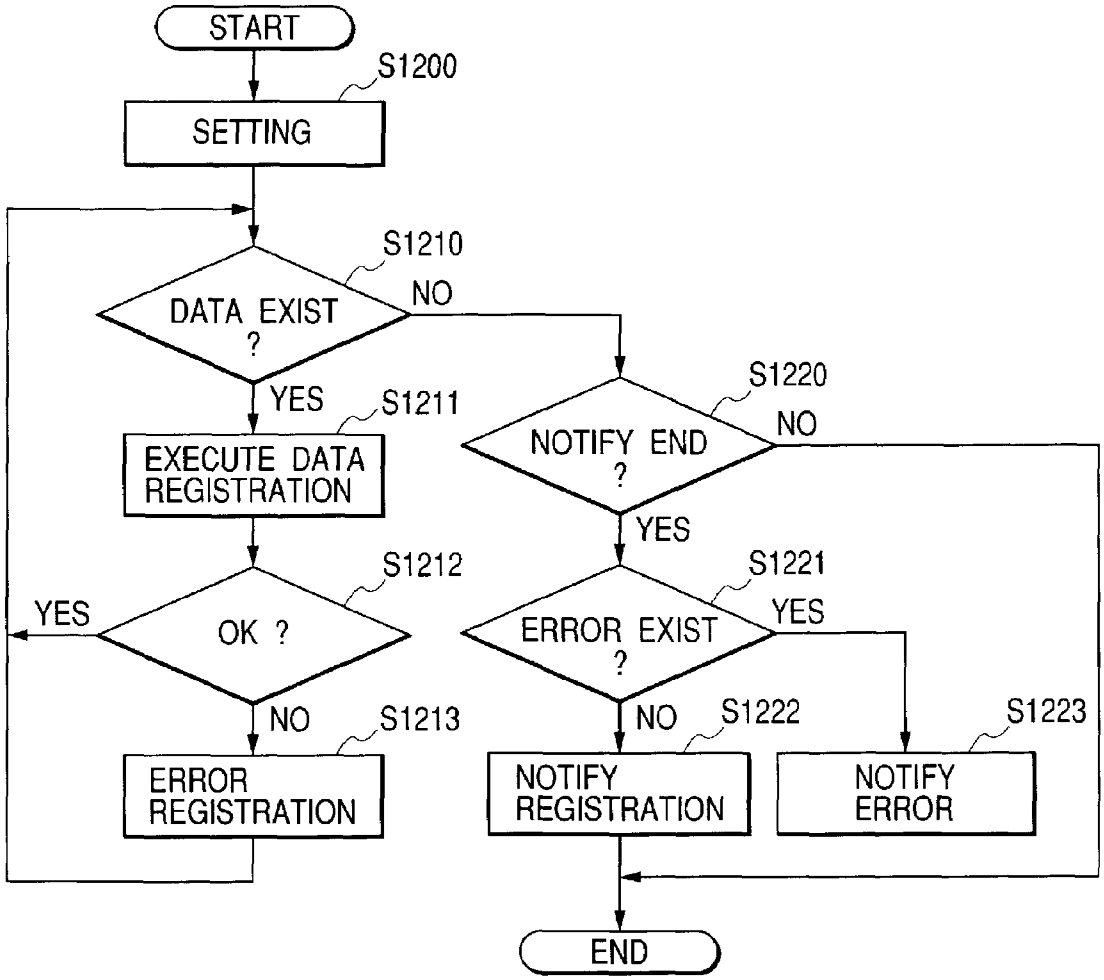
FIG. 16 is a flowchart showing a supplement to the release processing.

A supplement to the release (registration) processing (step S940) to the document management system will be described referring to FIG. 16.

In step S1200, setting processing is executed when starting the release processing, wherein a check of whether an end notification is required, and information acquisition processing of a destination of the end notification are carried out.

In step S1210, there is executed check processing of whether remaining data that should be registered in the document management system exist or not. If all the data that should be registered are not transmitted, the processing proceeds to step S1211, and, if there is no remaining data, the processing diverts to step S1220.

Registration processing of transmitting and registering data to be registered to the document management system, is executed in step S1211.

In step S1212, it is judged whether the transmitted data are registered. When confirming that the data are registered, the processing returns to step S1210. If the registration falls into a failure, the processing proceeds to step S1213.

Step S1213 is processing executed when an error occurs in the data registration in the document management system, wherein data about the document with a registration error occurred are registered as registration error document data on a predetermined worksheet, and thereafter re-registration processing can be executed manually.

In step S1220, it is judged based on the setting in S1200 whether the user needs to be notified of an end of registration. If not required, the processing is finished.

Whereas if judged to be necessary for notifying the user of the end, in step S1221, it is judged whether an error is seen in the result of the data registration processing. If the error does not occur, in step S1222, there is executed mail notification processing of notifying that a new document is registered in a mail address in the registration notification registered beforehand. Whereas if judging that the error occurs, in step S1223, there is executed mail notification processing of giving a notification of error information to a mail address of the error notification registered beforehand.

<Automatic Document Registration Processing (FIG. 17) for Document Transmitted from Device>

Figure 17:
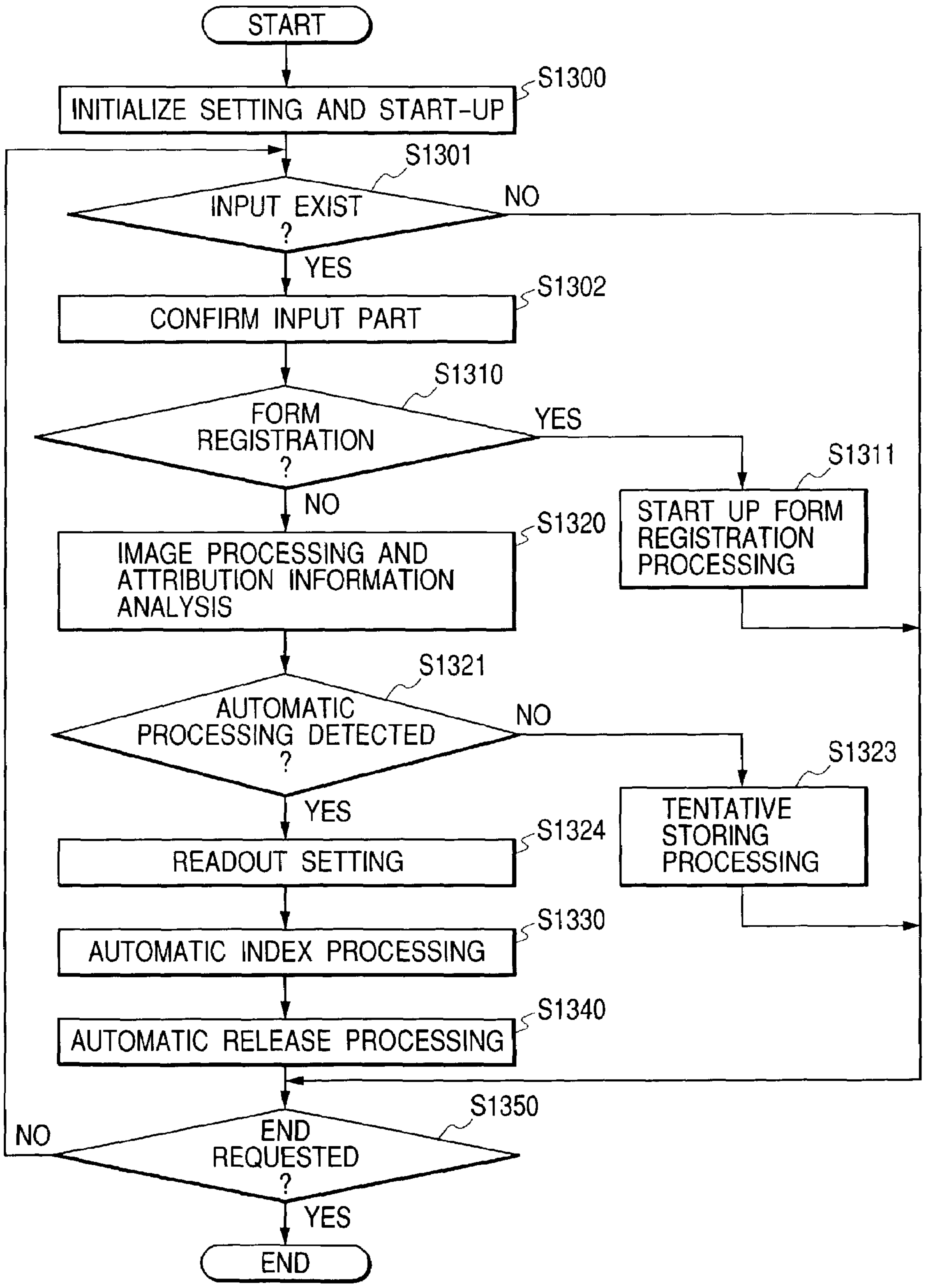
FIG. 17 is a flowchart showing automatic document registration processing of a document transmitted from a device.

FIG. 17 illustrates a flow in which the document data sent from the device automatically undergoes processing up to the document registration. Note that FIG. 17 shows the document registration automatic processing in the document management system and the form registration automatic processing in the document registration system.

In step S1300, various items needed for executing the automatic document processing are set previously, and this set automatic document processing is started up.

The setting items set herein include setting related to the document input processing, setting of the folder operated for the form registration processing and of the attribute information for use, setting of the worksheet for executing the processing corresponding to each of the attributes, and setting of the form used for implementing the automatic index input.

Incidentally, the following are examples of the attribute information. The attribute information is used for distinguishing between categories of the automatic processing and for the index input.

Type of device;

folder path (the file server 130, the data folder 300 for the device control part);

Owner information of the document;

Sender's information in the received facsimile document; and

Result of area analysis.

In step S1301, it is detected whether the document input is done. If the document input is done, the processing proceeds to step S1302. According to this embodiment, the document data inputted from the device via the device control part and the document data inputted from the device via the folder control part, can be handled in unification. The assumption in this embodiment is that the document transmitted by the push technique from the device be inputted via the data folder of the device control part. Note that a detection as to whether a new document is inputted to the folder, is made by periodically checking the folder as in steps S721 through S725 in FIG. 9.

In step S1302, it is checked which route the inputted document takes to come in.

In step S1310, it is judged whether the document is a document inputted via the folder for the form registration. If judged to be inputted via the folder for the form registration, in step S1311, a processing part for the form registration is automatically started up, and the inputted document is registered as a form.

In step S1320, various categories of attribute information are analyzed, and it is checked whether processing corresponding to the acquired attribute information is defined or not. For example, it is assumed that the processing be defined so that the document inputted via a predetermined data folder A and the document inputted directly from a predetermined device undergo the automatic processing of registering in a folder X of a predetermined document management system.

Note that the attribute information includes pieces of information about the device and the folder that are obtained by the input control part 220, and information obtained from a predetermined target area by invoking the processing corresponding to the automatic index processing at this stage and analyzing the form.

In step S1321, it is judged whether the automatic processing corresponding to the attribute information of the inputted document is detected. If not detected, the processing proceeds to step S1323, wherein the inputted document is cached, then index-inputted manually by the user later on and undergoes the registration processing in the document management system.

Whereas if the automatic processing corresponding thereto is detected (if, for instance, the automatic registration processing in the folder X of the predetermined document management system is detected), the processing goes to step S1324, in which pieces of information necessary for the automatic index processing and the automatic release processing are read out. In step S1330, the automatic index input is conducted by use of the area information etc corresponding to the form as the necessity arises. The automatic release processing of registering the document concerned and the index in the document management system, is executed in step S1340.

In step S1350, it is judged whether an end request of the automatic document processing is made. If requested, the processing is terminated. Whereas if not requested, the processing loops back to step S1301, wherein the processing continues.

Figure 19:
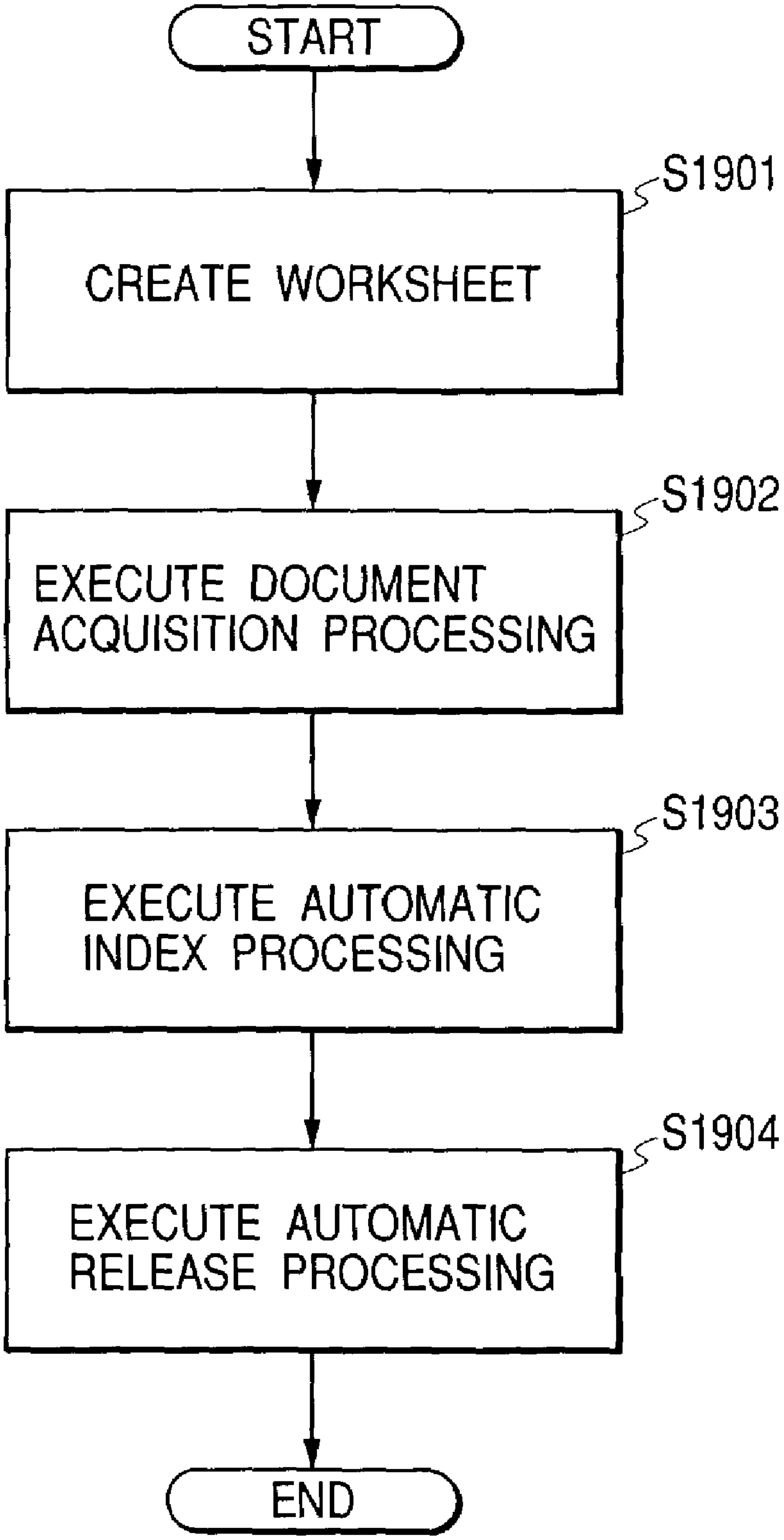
FIG. 19 is a flowchart showing document registration automatic processing in the document management system.

FIG. 17 shows the document registration automatic processing in the document management system and the form registration automatic processing in the document registration system as the registration form in the same flowchart. FIG. 19, however, fully shows only the document registration automatic processing in toe document management system in a flowchart.

The document registration system monitors the folder according to the generated job. Then, when the image is detected, the processing starts automatically based on the setting in the job.

In step S1901, the worksheet creation processing is executed based on the template set in the job corresponding to the folder stored with the transmitted image. This worksheet creation processing, though shown in FIG. 5, is herein such that a worksheet having the same filed items as those of the template is created without performing the field edit.

In step S1902, the image detected in the folder is taken into and stored on the thus created worksheet. The image taken into the worksheet undergoes the automatic index processing (see FIG. 10) in step S1903. In step S1904, the image is registered by the automatic release processing (see FIG. 11) in the document registration server together with the attribute information attached by the automatic index processing.

As discussed above, according to this embodiment, the document transmitted from the device by the push technique is automatically indexed and thus registered in the document management part, and it is therefore possible to register the document in the document registration system without the user's operation of the document registration system (without any user's labor). Further, it is also possible to prevent the document from staying unprocessed in the document registration system.

Further, the index input is carried out while executing the automatic recognition processing, with the result that there is no mistake in the manual input by the user.

What is claimed is:

1. A document registration system comprising:

determining means for automatically determining whether document image data transmitted from an external device by a push technique is stored in a predetermined folder;

acquisition means for automatically acquiring the document image data stored in the predetermined folder when said determining means determines that new document image data is stared in the predetermined folder;

recognition means for automatically executing recognition processing of the acquired document image data; and registration means for automatically registering the document image data into a document management system together with a result of the recognition processing executed by said recognition means as an index.

2. A document registration system according to claim 1, wherein said acquisition means acquires the document image data transmitted by the push technique from any one of a plurality of external devices connected via a network to said document registration system.

3. A document registration system according to claim 1, wherein said recognition means includes form identifying means for automatically identifying a registration form judged coincident with the acquired document image data, and said recognition means extracts an area corresponding to the document image data on a basis of an area set in the identified registration form, and executes the recognition process of the extracted area.

4. A document registration system according to claim 3, further comprising:

storage means for storing the document image data within said document registration system if said form identifying means can not identify the registration form judged coincident; and manual input registration means for registering the stored document image data in said document management system in a way that attaches an index by a manual input of the user.

5. A document registration system according to claim 1, wherein said determining means determines whether the document image data is stored in the predetermined folder by periodically searching the predetermined folder.

6. A document registration system according to claim 5, wherein the recognition processing by said recognition means and the registration processing by said registration means are each defined as processing corresponding to the folder cached with the document image data transmitted.

7. A document registration system according to claim 1, wherein the recognition processing executed by said recognition means includes at least any one of character recognition processing and barcode recognition processing.

8. A document registration system according to claim 1, further comprising setting means for setting an automatic processing condition used when registering, in said document management system, the document image data together with a result, as an index, of the automatic recognition processing of the document image data.

9. A document registration system according to claim 8, further comprising:

condition judging means for judging whether the document image data meet the automatic processing condition;

storage means for storing the document image data within said document registration system if said condition judging means judges that the document image data do not meet the automatic processing condition; and manual input registration means for registering the stored document image data in said document management system in a way that attaches an index by a manual input of the user.

10. A document registration system according to claim 8, wherein said registration means registers in a document management system specified based on the automatic processing condition among a plurality of document management systems connected via the network to said document registration system.

11. A document registration system according to claim 1, wherein in said document registration system, the document image data and the index are stored by use of a worksheet, and, when said registration means registers the document image data in said document management system, executes the registration processing of the registration target document image data by use of the index mapping thereto in the worksheet.

12. A document registration method for controlling a document registration system for automatically registering, in a document management system, document image data, said method comprising:

a step of automatically determining whether document image data transmitted from an external device by a push technique is stored in a predetermined folder;

a step of automatically acquiring the document image data stored in the predetermined folder when said determining step determines that new document image data is stored in the predetermined folder;

a step of automatically executing recognition processing of the acquired document image data; and a step of automatically registering the document image data into a document management system together with a result of the recognition processing executed in said recognizing step as an index.

13. A document registration program stored on a computer-readable medium, said program being executable by a computer, for controlling a document registration system for automatically registering, in a document management system, document image data, said program comprising:

a program code for executing a step of automatically determining whether document image data transmitted from an external device by a push technique is stored in a predetermined folder;

a program code for executing a step of automatically acquiring the document image data stored in the predetermined folder when said determining step determines that new document image data is stored in the predetermined folder;

a program code for executing a step of automatically executing recognition processing of the acquired document image data; and a program code for executing a step of automatically registering the document image data into a document management system together with a result of the recognition processing executed in said recognizing step as an index.

14. A computer-readable storage medium stored with a document registration program, executable by a computer, for controlling a document registration system for automatically registering, in a document management system, document image data transmitted from an external device by a push technique, said program comprising:

a program code for executing a step of automatically determining whether document image data transmitted from an external device by a push technique is stored in a predetermined folder;

a program code for executing a step of automatically acquiring the document image data stored in the predetermined folder when said determining step determines that new document image data is stored in the predetermined folder;

a program code for executing a step of automatically executing recognition processing of the acquired document image data; and a program code for executing a step of automatically registering the document image data into a document management system together with a result of the recognition processing executed in said recognizing step as an index.

* * * * *